(12) United States Patent
Lin et al.

(10) Patent No.: US 6,596,185 B2
(45) Date of Patent: Jul. 22, 2003

(54) FORMATION OF OPTICAL COMPONENTS ON A SUBSTRATE

(75) Inventors: Wenhua Lin, Pasadena, CA (US); Chi Wu, San Marino, CA (US)

(73) Assignee: Lightcross, Inc., Montesey Park, CA (US)

( * ) Notice: Subject to any disclaimer, the term of this patent is extended or adjusted under 35 U.S.C. 154(b) by 129 days.

(21) Appl. No.: 09/785,565

(22) Filed: Feb. 16, 2001

(65) Prior Publication Data

US 2002/0114571 A1 Aug. 22, 2002

Related U.S. Application Data

(60) Provisional application No. 60/287,555, filed on Nov. 28, 2000.

(51) Int. Cl.[7] .......................... B29D 11/00; B44C 1/22; H01L 21/301
(52) U.S. Cl. ....................... 216/24; 438/462; 216/41
(58) Field of Search ................................. 216/2, 24, 79, 216/41; 438/7, 33, 68, 462, 463, 464, 460; 385/18; 359/872, 226

(56) References Cited

U.S. PATENT DOCUMENTS

| 4,618,210 | A | | 10/1986 | Kondo |
| 4,747,654 | A | | 5/1988 | Yi-Yan |
| 4,813,757 | A | | 3/1989 | Sakano et al. |
| 4,846,542 | A | | 7/1989 | Okayama et al. |
| 5,002,350 | A | | 3/1991 | Dragone |
| 5,013,113 | A | | 5/1991 | Soref |
| 5,039,993 | A | | 8/1991 | Dragone |
| 5,140,149 | A | | 8/1992 | Sakata et al. |
| 5,243,672 | A | | 9/1993 | Dragone |
| 5,259,925 | A | * | 11/1993 | Herrick et al. ............. 438/460 |
| 5,412,744 | A | | 5/1995 | Dragone |
| 5,450,511 | A | | 9/1995 | Dragone |
| 5,467,418 | A | | 11/1995 | Dragone |

(List continued on next page.)

FOREIGN PATENT DOCUMENTS

| EP | 0647861 A1 | 4/1995 |
| EP | 0849615 A2 | 6/1998 |
| EP | 0985842 A2 | 3/2000 |
| JP | 63-197923 | 8/1988 |
| JP | 2-179621 | 7/1990 |
| JP | 6-186598 | 7/1994 |

OTHER PUBLICATIONS

Studenkov, et al., *Efficient Coupling in Integrated Twin–Waveguide Lasers Using Waveguide Tapers*, IEEE Photonics TEchnology LettersElectronics Letters, vol. 11, No. 9, Sep. 1999, pp. 1096–1098.

Abe, et al., *Optical Path Length Trimming Technique using Thin Film Heaters for Silica–Based Waveguides on Si*, Electronics Letters, Sep. 12, 1996, vol. 32—No. 19, pp. 1818–1820.

Albert, J., *Planar Fresnel Lens Photoimprinted in a Germanium–Doped Silica Optical Waveguide*, Optics Letters, May 15, 1995, vol. 20—No. 10, pp. 1136–1138.

(List continued on next page.)

*Primary Examiner*—Shrive P. Beck
*Assistant Examiner*—Robert P Culbert
(74) *Attorney, Agent, or Firm*—Law Offices of Travis L. Dodd, P.C.

(57) ABSTRACT

A method of separating optical components is disclosed. The method includes obtaining a substrate structure having a plurality of optical components formed on the substrate structure. The method also includes performing a separation etch on a separation region of the substrate structure. The separation region is selected such that separating the substrate structure at the separation region separates at least one of the optical components from the other optical components.

19 Claims, 16 Drawing Sheets

U.S. PATENT DOCUMENTS

| | | | |
|---|---|---|---|
| 5,581,643 A | | 12/1996 | Wu |
| 5,597,766 A | * | 1/1997 | Neppl ........................ 438/460 |
| 5,706,377 A | | 1/1998 | Li |
| 5,841,931 A | | 11/1998 | Foresi et al. |
| 5,938,811 A | | 8/1999 | Greene |
| 6,108,478 A | | 8/2000 | Harpon et al. |
| 6,118,909 A | | 9/2000 | Chen et al. |
| 6,324,204 B1 | | 11/2001 | Deacon |

OTHER PUBLICATIONS

Aman, M.C., *Calculation of Metal–Clad Ridge–Waveguide (MCRW) Laser Modes by Mode Coupling Technique*, Journal of Lightwave Technology, vol. LT–4, No. 6, Jun. 1986, pp. 689–693.

Amann, M.C. et al, *Calculation Of The Effective Refractive–Index Step For The Metal–Cladded–Ridge–Waveguide Laser*, Applied Optics, vol. 20, No.8, Apr. 15, 1981, pp. 1483–1486.

Baba, S. et al., *A Novel Integrated–Twin–Guide (ITG) Optical Switch with a Built–in TIR Region*; IEEE Photonics Technology Letters; vol. 4, No.5, May 1992, pp. 486–488.

Benson, T.M., *Etched–Wall Bent–Guide Structure for Integrated Optics in the III–V Semiconductors*; Journal of Lightwave Technology, vol. LT–2, No. 1, Feb. 1984; pp. 31–34.

Berry, G.M. et al., *Analysis Of Multiplayer Semiconductor Rib Waveguides With High Refractive Index Substrates*, Electronics Letters; vol. 29, No.22; Oct. 28, 1993, pp. 1941–1942.

Betty, I. et al., *A Robust, Low–Crosstalk, InGaAsP/InP Total–Internet–Reflection Switch For Optical Cross–Connect Application*.

Burke, S.V., *Spectral Index Method Applied to Coupled Rib Waveguides*; Electronics Letters, vol. 25, No. 9, Apr. 27, 1989, pp. 605–606.

Burns, W.K. et al., *Mode Conversion in Planar–Dielectric Separating Waveguides*; IEEE Journal of Quantum Electronics, vol. QE–11, No. 1, Jan. 1975; pp. 32–39.

Cai, Y. et al., *A Novel Three–Guide Optical Coupler Using A Taper–Formed Waveguide*; j. Appl. Phys 69(5), Mar. 1991; pp. 2810–2814.

Cavailles, J.A. et al., *First Digital Optical Switch Based on InP/GainAsP Double Heterostructure Waveguides*; Electronics Letters, vol. 27, No.9, Apr. 25, 1991, pp. 699–700.

Chen, R.T. et al., *Design and Manufacturing of WDM Devices*; Proceedings of SPIE vol. 3234.

Clemens, et al., *Wavelength–Adaptable Optical Phased Array in $SiO_2$–Si*, Oct. 1995, vol. 7—No.10, 1040–4041.

Dagli, N. et al., *Analysis of Rib Dielectric Waveguides*; IEEE Journal of Quantum Electronics, vol. QE–21, No. 4, Apr. 1985, pp. 315–321.

Dagli, N. et al., *Theoretical and Experimental Study of the Analysis and Modeling of Integrated Optical Components*; IEEE Journal of Quantum electronics, vol. 24, No. 11, Nov. 1988; pp. 2215–2226.

Deri, R.J., et al., *Low–Loss GaAs/AlGaAs Waveguide Phase Modulator Using A W–Shaped Index Profile*; Sep. 6, 1988.

Deri, R.J., et al., *Low–Loss Multiple Quantum Well GainAs/InP Optical Waveguides*; Feb. 21, 1989.

Devaux, F. et al., *20Gbit/s Operation of a High–Efficiency InGaAsP/InGaAsP MQW Electroabsorption Modulator With 1.2–V Drive Voltage*; IEEE Photonics Technology Letters, vol. 5, No. 11, Nov. 1993, pp. 1288–1290.

Doerr, C.R. et al., *Chirping Of The Waveguide Grating Router For Free–Spectral–Range Mode Selection In The Multifrequency Laser*, IEEE Photonics Technology Letters, Apr. 1996, vol. 8—No. 4, pp. 500–502.

Doerr, C.R. et al., *Chromatic Focal lane Displacement in the Parabolic Chirped Waveguide Grating Router*, May 1997, vol. 9—No. 5, pp. 625–627.

Dragone, c. *Efficient NxN Star Couplers Using Fourier Optics*, pp 479–48, Mar. 1989, vol. 7—No. 3, Journal of Lightwave Technology.

Fischer, et al., *Singlemode Optical Switches Based on SOI Waveguides with Large Cross–Section*, Electronics Letters, Mar. 3, 1994, vol. 30—No. 5, pp. 406–408.

Fischer, K. et al, *Sensor Application of SiOn Integrated Optical Waveguides On Silicon*; Elevier Sequoia, 1992; pp. 209–213.

Fish, G. et al., *Monolithic InP Optical Crossconnects: 4x4 and Beyond*, JWB2–1, pp. 19–21.

Furuta, H. et al, *Novel Optical Waveguide For Integrated Optics*, Applied Optics, vol. 13, No. 2, Feb. 1974, pp. 322–326.

Gini, E. et al., *Low Loss Self–Aligned Optical Waveguide Corner Mirrors in InGaAsP/InP*, WeP2.22.

Goel, K. et al *Design Considerations for Low Switching Voltage Crossing Channel Switches*; Journal of Lightwave Technology, vol. 6, No. 6, Jun. 1988; pp. 881–886.

Granestrand, P. et al., *Integrated Optics 4x4 Switch Matrix with Digital Optical Switches*; Electronics Letters, vol. 26, No. 1, Jan. 4, 1990, p. 4–5.

Himeno, A. et al., *Loss Measurement and Analysis of High–Silica Reflection Bending Optical Waveguides*, Journal of Lightwave Technology, Jan. 1988, vol. 6—No. 1, 41–46.

Hsu, K.Y. et al., *Photonics devices and Modules*, www.c-c.nctu.edu.tw/~ctr/lee_mti/research_topic/photonic_devices_modules.htm, pp. 1–3.

Huang, T.C. et al., *Depletion Edge Translation Waveguide Crossing Optical Switch*; IEEE Photonics Technology Letters; vol. 1, No. 7, Jul. 1989, pp. 168–170.

Hutcheson, L.D. et al., *Comparison of Bending Losses in Integrated Optical Circuits*; Optics Letters, vol. 5, No.6, Jun. 1980, pp. 360–362.

Inoue, H. et al, *Low Loss GaAs Optical Waveguides*, Journal of Lightwave Technology, vol. LT–3, No.6, Dec. 1985; pp. 204–209.

Irace, A. et al., *Fast Silicon–on–Silicon Optoelectronic Router Based on BMFET Device*, Journal of Selected Topics in Quantum Electronics, Jan./Feb. 2000, vol. 6—No. 1, pp. 14–18.

Ito, F. et al., *Carrier–Injection–Type Optical Switch In GaAs With A 1.06–1.55 $\mu m$ Wavelength Range*; Appl. Physics Letters, 54(2) Jan. 9, 1989; pp. 134–136.

Jackman, N. et al., *Optical Cross Connects for Optical Networking*; Bell Labs Technical Journal, Jan.–Mar. 1999; pp. 262–281.

Johnston, I.R., et al., *Silicon–Based Fabrication Process For Production Of Optical Waveguides*; IEE Proc–Optoelectron, vol. 143, No. 1, Feb.1996, pp. 37–40.

Kaenko, A. et al., *Athermal Silica–based Arrayed–waveguide Grating (AWG) Multiplexers with New Low Loss Groove Design*; TuO1–1, pp. 204–206.

Kasahara, R. et al., *Low–Power Consumption Silica–Based 2x2 Thermooptic Switch Using Trenched Silicon Substrate*, IEEE Photonics Technology Letters, vol. 11, No. 9, Sep. 1999, pp. 1132–1134.

Khan, M.N. et al., *Fabrication–Tolerant, Low–Loss, and High–Speed Digital Optical Switches in InGaAsP/InP Quantum Wells*; Proc. 21$^{st}$ Eur.Conf.onOpt.Comm.(ECOC '95–Brussels), pp. 103–106.

Khan, M.N. et al., *High–Speed Operation of Quantum Well Electron Transfer Digital Optical Switches*; pp. 102–102c.

Kirihara, T. et al., *Lossless And Low Crosstalk 4x4 Optical Switch Array; Electronics And Communications In Japan*, Part 2, vol. 77, No. 11, 1994, pp. 73–81.

Kirihara, T. et al., *Lossless and Low–Crosstalk Characteristics in an InP–Based 2x2 Optical Switch*, IEEE Photonics Technology Letters, vol. 5, No. 9 Sep. 1993, pp. 1059–1061.

Kokubun, Y. et al., *Athermal Waveguides for Temperature–Independent Lightwave Devices*, Nov. 1993, 1297–1298, vol. 5—No. 11, IEEE Photonics Technology Letters.

Kokubun, Y. et al., *Temperature–Independent Narrowband Optical Filter at 1.3 μm Wavelength by an Athermal Waveguide*, Oct. 10$^{th}$, 1996, vol. 32—No. 21, Electronics Letters.

Kokubun, Y. et al., *Temperature–Independnet Optical Filter at 1.55 μm Waveguide Using a Silica–Based Athermal Waveguide*, Feb. 19, 1998, vol. 34—No. 4, Electronics Letters.

Kokubun, Y. et al., *Three–Dimensional Athermal Waveguides for Temperature Independent Lightwave Devices*, Jul. 21$^{st}$, 1994, vol. 30—No. 15, Electronics Letters.

Kostrzewa, C. et al., *Tunable Polymer Optical Add/Drop Filter for Multiwavelength Networks*, Photonics Technology Letters, Nov. 1997, vol. 9—No. 11, 1487–1489.

Laakman, K.D. et al., *Waveguides: Characteristic Modes Of Hollow Rectangular Dielectric Waveguides*; Applied Optics, vol. 15, No. 5, May 1976; pp. 1334–1340.

Lee, T.P. et al., *Al$_x$Ga$_{1-x}$As Double–Heterostructure Rib–Waveguide Injection Laser*, IEEE Journal of Quantum Electronics; vol. QE–11, No.7, Jul. 1975; pp. 432–435.

Liu, Y.L. et al., *Silicon 1x2 Digital Optical Switch Using Plasma Dispersion*; Electronics Letters, vol. 30, No. 2, Jan. 20, 1994; pp. 130–131.

Mak, G. et al., *High–Speed Bulk InGaAsP–InP Electroabsorption Modulators with Bandwidth in Excess of 20 GHz*, IEEE Photonics Technology Letter, vol. 2, No. 10, Oct. 1990, pp. 730–733.

Marcatili, E., *Improved Coupled–Mode Equations for Dielectric Guides*; IEEE Journal of Quantum Electronics, vol. QE–22, No. 6, Jun. 1986; pp. 988–993.

Marcatili, E.A.J., *Bends In Optical Dielectric Guides*; The Bell System Technical Journal, Sep. 1969; pp. 2103–2132.

Marcatili, E.A.J., *Dielectric Rectangular Waveguide and Directional Coupler for Integrated Optics*, The Bell System Technical Journal, Sep. 1969, pp. 2071–2101.

Marcatili, E.A.J., *Slab–Coupled Waveguides*; The Bell System Technical Journal, Apr. 1974; American Telephone & Telegraph Company, vol. 53, No. 4, Apr. 1974.

Mirza, A.R. et al, *Silicon Wafer Bonding For MEMS Manufacturing*, Solid State Technology, Aug. 1999, pp. 73–78.

Moerman, I. et al., *A Review on Fabrication Technologies for the Monolithic Integration of Tapers with III–V Semiconductor Devices*; IEEE Journal of Selected Topics In Quantum electronics, vol. 3, No. 6, Dec. 1997, pp. 1308–1320.

Müller, G. et al., *First Low Loss InP/InGaAsP Optical Switch with Integrated Mode Transformers*; ThC12; pp. 37–40.

Nayyer, J. et al., *Analysis of Reflection–Type Optical Switches with Intersecting Waveguides*, Journal of Lightwave Technology, vol. 6, No. 6, Jun. 1988; pp. 1146–1152.

Negami, t. et al., *Guided–Wave Optical Wavelength Demultiplexer Using An Asymmetric Y Junction*; Appl. Phys. Lett. 54(12), Mar. 20, 1989; pp. 1080–1082.

Nelson, W. et al., *Optical Switching Expands Communications–Network Capacity*; Laser Focus World, Jun. 1994, pp. 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, vol. 6, No. 22, Nov. 1994; pp. 1332–1334.

Noda, Y. et al., *High–Speed Electroabsorption Modulator with Strip–Loaded GainAsP Planar Waveguide*; Journal of Lightwave Technology, vol. LT–4, No. 10, Oct. 1986, pp. 1445–1453.

Offrein, B.J. et al., *Resonant Coupler–Based Tunable Add–After–Drop Filter in Silicon–Oxynitride Technology for WDM Networks*, Journal of Selected Topics in Quantum Electronics, vol. 5—No. 5, 1400–1405.

Okamoto, K. et al., *Arrayed–Waveguide Grating Multiplexer With Flat Spectral Response*; Optics Letters, Jan. 1, 1995; vol. 20, No. 1; pp. 43–45.

Okamoto, K. et al., *Flat Spectreal Response Arrayed–Waveguide Grating Multiplexer with Parabolic Waveguide Horns*, Electronics Letters Online, Jul. 15, 1996, No. 19961120, pp. 1661–1662.

Okayama, H. et al., *8x8 Ti:LNbO$_3$ Waveguide Digital Optical Switch Matrix*; IEICE Trans. Commun.; vol. E77–B, No. 2; Feb. 1944; pp. 204–208.

Okayama, H. et al., *Dynamic Wavelength Selective Add/Drop Node Comprising Tunable Gratings, Electronics Letters Online*, Apr. 10, 1997, No. 19970607.

Okayama, H. et al., *Reduction of Voltage–Length Product for Y–Branch Digital Optical Switch*, Journal of Lightwave Technology, vol. 11, No. 2, Feb. 1993; pp. 379–387.

Okuno, M. et al., *Strictly Nonblocking 16x16 Matrix Switch Using Silica Based Planar Lightwave Circuits*, vol. 10, No. 266, Sep. 11, 1986.

Ooba, N. et al., *Athermal Silica–Based Arrayed–Waveguide Grating Multiplexer Using Bimetal Plate Temperature Compensator*, Electronics Letters, Oct. 12$^{th}$, 2000, vol. 36, No. 21, pp. 1800–1801.

Renaud, M. et al., *Compact Digital Optical Switches for Low Insertion Loss Large Switch Arrays on InP*; Proc. 21$^{st}$ Eur.Conf.on Opt. Comm. (ECOC '95–Burssels), pp. 99–102.

Rickman, A.G. et al., *Eilicon–on–Insulator Optical Rib Waveguide Loss and Mode Characteristics*, Journal of Lightwave Technology, Oct. 1994, vol. 12—No. 10, pp. 1771–1776.

Rolland, C. et al., *10 Gbit/s, 1.56 μm, Multiquantum Well InP/InGaAsP Mach–Zehnder Optical Modulator*; Electronics Letters, Mar. 4, 1993, vol. 29, No. 5, pp. 471–472.

Santec Sales Brochure for year 2000 entitled "Optical Components".

Schauwecker, B. et al, *Small–Size Silicon–Oxynitride AWG Demultiplexer Operating Around 725 nm*, IEEE Photonics Technology Letters, vol. 12 No. 12, Dec. 2000.1

Schlachetzki, A. *Monolithic IO–Technology–Modulators and Switches Based on InP*; SPIE vol. 651 Integrated Optical Circuit Engineering III (1986), pp. 60–86.

Silberberg, Y. et al., *Digital Optical Switch*; Appl. Phys. Lett.; vol. 51, No. 16, Oct. 19, 1987, pp. 152–154.

Smit, M.K., *New Focusing and Dispersive Planar Component Based on an Optical Phased Array*; Electronics Letters; Mar. 31, 1988, vol. 24, No.7; pp. 385–386.

Smith, S.D. et al., *CW Operation of Corner Cavity Semiconductor Lasers*; IEEE Photonics Technology Letters, vol. 5, No. 8, Aug. 1993; pp. 876–879.

Sneh, A. et al., *Compact Low Crosstalk and Low Propagation Loss Quantum–Well Y–Branch Switches*; PDP 4–1~4–5.

Soole, J.B.D. et al., *Use of Multimode Interference Couplers to Broaden the Passband of Wavelength–Dispersive Integrated WDM Filters*; IEEE Photonics Technology Letters, vol. 8, No. 10, Oct. 1996; pp. 1340–1342.

Stoll, L. et al., *1:8 Optical Matrix Switch on InP/InGaAsP with Integrated Mode Transformers*; Optical Switches and Modulators II, pp. 531–534.

Stoll, L. et al., Compact and Polarization Independent Optical Switch on InP/InGaAsP; TuB7.2; pp. 337–340.

Stutius, W. et al, *Silicon Nitride Films On Silicon For Optical Waveguides*, Applied Optics, vol. 16, No. 12, Dec. 1977, pp. 303–307.

Sugie, T. et al., *1.3–µm Laser Diodes with a Butt–jointed Selectively Grown Spot–Size Converter*, ThB2–6, IOOC95, pp. 52–53.

Tada, K. et al., *Bipolar Transistor Carrier–Injected Optical Modulator/Switch: Proposal and Analysis*, IEEE Electron Device Letters, vol. EDL–7, No. 11, Nov. 1986, pp. 605–606.

Takada, et al., *Optical Spectrum analyzer using Cascaded AWG's with Different Channel Spacings*, Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resolution*, PWG–NTT–7.

Takiguchi, K. et al, *Dispersion Compensation Using a Planar Lightwave Circuit Optical Equalizer*, Photonics Technology Letters, Apr. 1994, vol. 6, No. 4, pp. 561–564.

Tien, P.K. et al., *Formation of Light–Guiding Interconnections in an Integrated Optical Circuit by Composite Tapered–Film Coupling*; Applied Optics, vol. 12, No. 8, Aug. 1973; pp. 1909–1916.

Toyoda et al., *Thermoplastic Switch and Wavelength Tunable Filter using Polymer Waveguides*, Abstract of paper presented at Opticomm 2001 on Aug. 22, 2001.

Treyz, G.V. et al., *Silicon Optical Modulators at 1.3 µm Based on Free–Carrier Absorption*; IEEE Electron Device Letters, vol. 12, No. 6, Jun. 1991; pp. 276–278.

Tsuda, H. et al., *Performance Analysis of a Dispersion Compensator Using Arrayed–Waveguide Gratings*, Journal of Lightwave Technology, Aug. 2000, vol. 18—No. 8, pp. 1139–1147.

Tsude, H. et al., *Second– and Third–Order Dispersion Compensator Using a High–Resolution Arrayed Waveguide Grating*, IEEE Photonics Technology Letters, May 1999, vol. 11—No. 5, 569–571.

Vinchant et al, *InP 4x4 Digital–Optical–Switch Module for Multiwavelength Cross–Connect Applications*; OFC '95 Technical Digest, Thursday ThK2, pp. 281–282.

Vinchant, J.F. et al., *First Polarisation insensitive 4x4 Switch matrix on InP with Digital Optical Switches*, TuB7.3, pp. 341–344.

Vinchant, J.F. et al., *InP Digital Optical Switch: Key Element for Guided–Wave Photonic Switching*; IEE Proceedings-J, vol. 140, No. 5, Oct. 1993; pp. 301–307.

Vinchant, J.F. et al., *Low Driving Voltage or Current Digital Optical Switch on InP for Multiwavelength System Applications*; Electronics Letters, vol. 28, No. 12, Jun. 4, 1992; pp. 1135–1137.

Wakita, K. et al., *Long Wavelength Waveguide Multiple Quantum Well Optical Modulators*; IEEE Journal of Quantum Electronics, vol. QE–23, No. 12, Dec. 1987, pp. 2210–2215.

Wanru, Z. et al., *Total Internal Reflection Optical Switch with Injection Region Isolated by Oxygen Ion Implantation*; pp. 1–10.

Yamada, et al., *Cross Talk Reduction in a 10 GHz Spacing Arrayed–Waveguide Grating by Phase–Error Compensation*, Journal of Lightwave Technology, Mar. 1998, vol. 16—No. 3, pp. 364–371.

Yanagawa, H. et al., *Polarization–and Wavelength–Insensitive Guided–Wave Optical Switch with Semiconductor Y Junction*; Journal of Lightwave Technology, vol. 8, No. 8, Aug. 1990, pp. 1192–1197.

Yu, S. et al., *High Speed All–Optical Packet Routing Using A Vertical Coupler Crosspoint Space Switch*.

Yu, S. et al., *Ultralow Cross–Talk, compact integrated optical crosspoint space switch arrays employing active InGaAsP/InP Vertical Waveguide Couplers*, Integrated Optical Crosspoint Switch Arrays, Siyuan Yu et a, CPD24–2.

Zengerle, R. et al., *Tapered Twin Waveguides For Spot–Size Transformation In InP*; The B2–5; IOOC 95; pp. 50–51.

Zirnigibl, M. et al., *Digitally Tunable Laser Based On The Integration Of A Waveguide Grating Multiplexer And An Optical Amplifier*, IEEE Photonics Technology Letters, Apr. 1994, vol. 6—No. 4, pp. 516–517.

Zucker, J.E. et al., *Strained Quantum Wells for Polarization–Independent Electrooptic Waveguide Switches*, Journal of Lightwave Technology, vol. 10, No. 12, Dec. 1992, pp. 1926–1930.

* cited by examiner

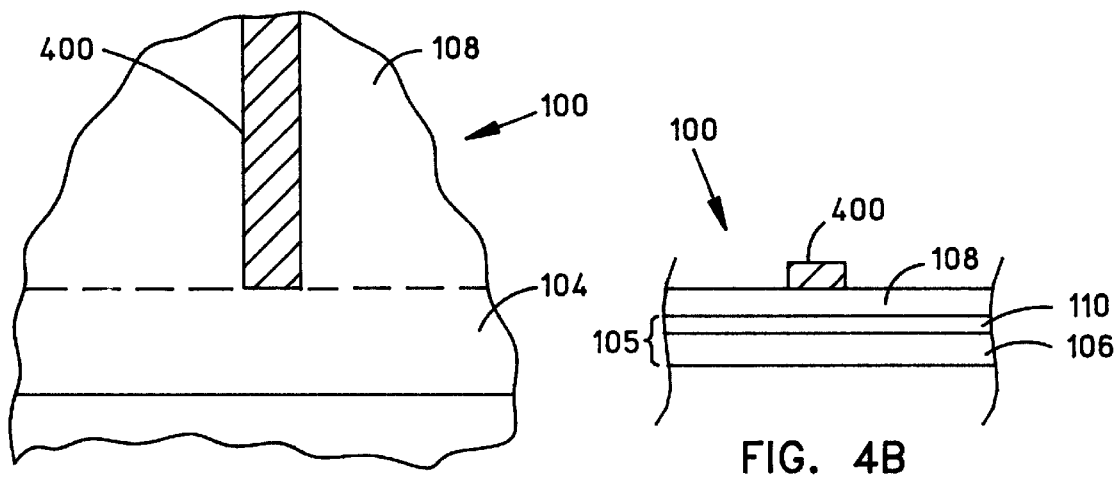
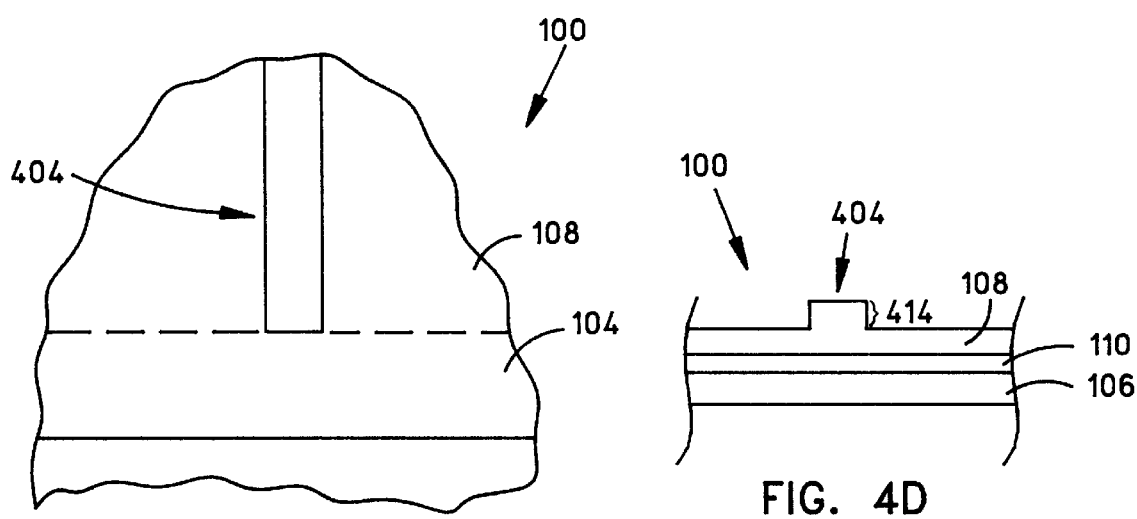
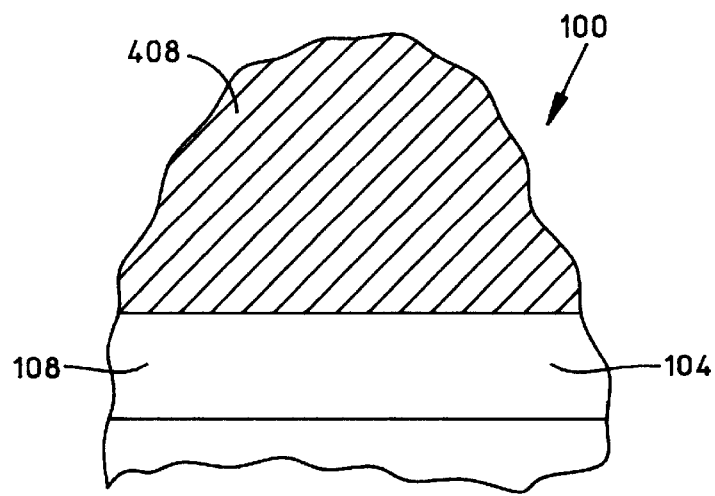

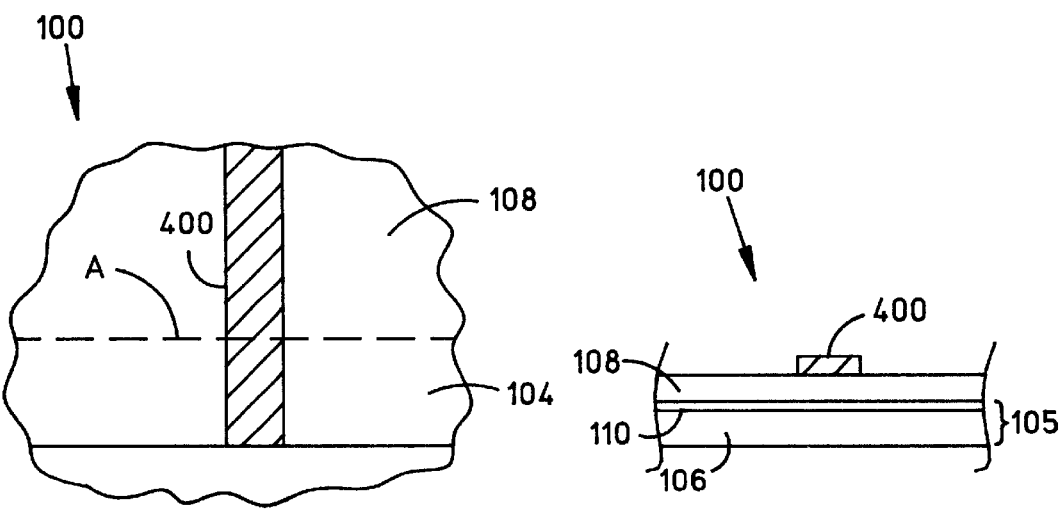
FIG. 5A
FIG. 5B
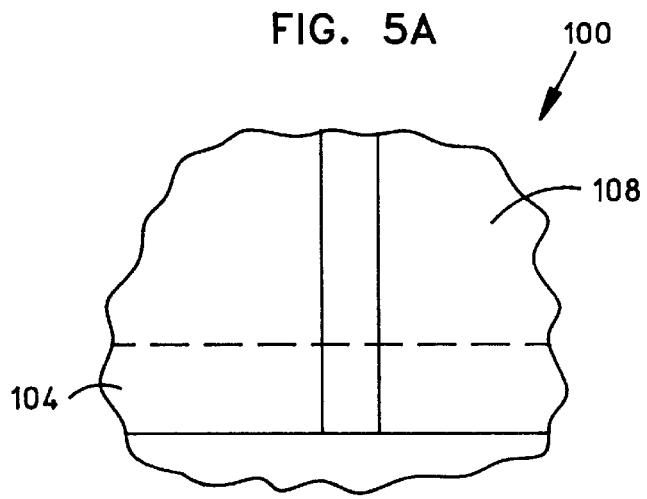
FIG. 5C
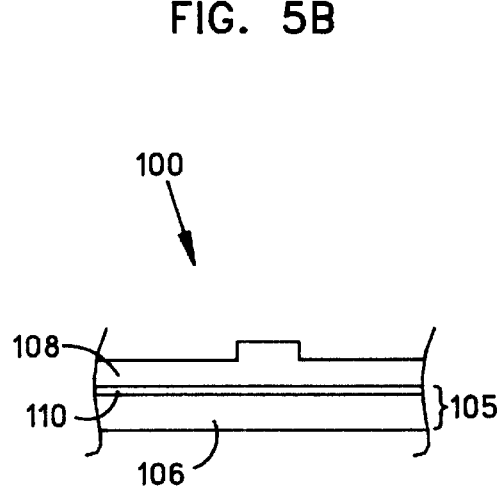
FIG. 5D
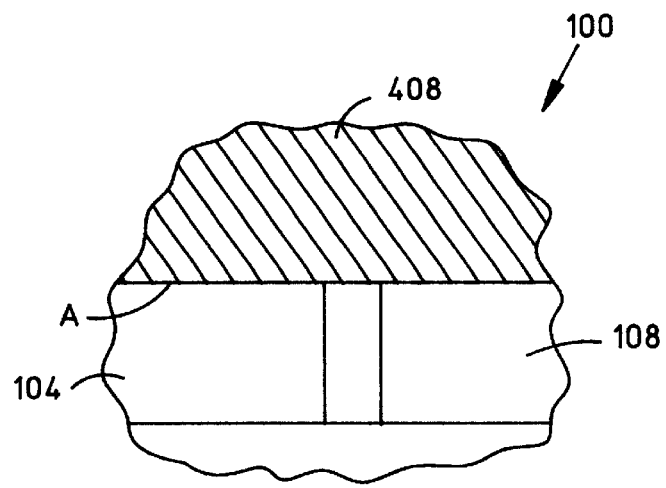
FIG. 5E

FORMATION OF OPTICAL COMPONENTS ON A SUBSTRATE

RELATED APPLICATIONS

This application claims the benefit of U.S. Provisional Application No. 60/287,555; filed on Nov. 28, 2000; entitled "Method of Fabricating Components on a Substrate" and incorporated herein in its entirety.

This application is also related to U.S. patent application entitled "Formation Of A Vertical Smooth Surface On An Optical Component", Ser. No. 09/690,959, filed on Oct. 16, 2000 and incorporated herein in its entirety.

BACKGROUND

1. Field of the Invention

The invention relates in general to methods of manufacturing, more particularly, to methods of separating optical components formed on a substrate.

2. Background of the Invention

A variety of electrical and optical components are formed on substrates such as silicon and silica. A typical component manufacturing process involves etching the various parts of the components and interconnects onto the surface of a wafer. Ingots can be grown and several disc-shaped wafers are sliced from the ingot. Due to cost and fabrication time efficiencies, several devices are formed on a single wafer. After several components are formed on a wafer the components are separated.

Conventional methods of separating the components include sawing, mechanically cutting, and using a laser or milling machine. Often the edges of the separated components are further finished by polishing. Conventional methods, however, have several disadvantages. For example, vibrational and thermal and other stresses caused by cutting and polishing fatigue the material and result in less than optimum performance of the components. Often the stresses of the separation process do not affect performance of the component until a period of time has passed and the stress fractures and fissures have propagating from the edge of the substrate to critical components.

Optical components using conventional separation techniques are particularly susceptible to the problems discussed above. Due to the small wavelength of light, the performance of optical components is significantly affected by imperfections such as fractures or fissures. Further, the interfaces of optical components such as facets are often formed by cutting and polishing. In addition to the problems discussed above, the cutting and polishing of an optical interface can result in an interface with poor transmission and reflective characteristics.

Therefore, there is a need for a method for separating components formed on a substrate.

SUMMARY OF THE INVENTION

The invention relates to a method of separating optical components. The method includes obtaining a substrate structure having a plurality of optical components formed on the substrate structure. The method also includes performing a separation etch on a separation region of the substrate structure. The separation region is selected such that separating the substrate structure at the separation region separates at least one of the optical components from the other optical components.

Another embodiment of the method includes obtaining a substrate structure having an optical component formed on the substrate structure. The method also includes performing a separation etch on a separation region of the substrate structure. The separation region is selected such that separating the substrate structure at the separation region trims the substrate structure away from the optical component.

In some instances, the component(s) includes a waveguide and the separation etch is performed so as to form at least a portion of a facet on the waveguide. The separation etch can optionally be performed so the facet is angled at less the ninety degrees relative to a direction of propagation of light signals traveling along the waveguide.

The invention also relates to a substrate structure. The substrate structure includes a plurality of optical components positioned on the substrate structure. A groove is formed on the substrate structure. The groove is positioned such that separating the substrate structure along the groove separates at least one of the optical components from the other optical components.

Another embodiment of the substrate structure includes an optical component positioned on the substrate structure. A groove is formed on the substrate structure. The groove is positioned such that separating the substrate structure along the groove trims the substrate structure away from the optical component.

In some instances, the groove is positioned adjacent to a facet of one or more waveguides positioned on the optical component(s). The facet can optionally be angled at less than ninety degrees relative to a direction of propagation of light signals traveling along the waveguide.

BRIEF DESCRIPTION OF THE FIGURES

FIG. 4A through FIG. 4I illustrate a method of forming a facet during a separation etch.

FIG. 5A through FIG. 5J illustrate an embodiment of a method of forming a facet during a separation etch. The illustrated method does not require alignment of subsequently formed masks.

DETAILED DESCRIPTION OF THE PREFERRED EMBODIMENT

Figure 1:
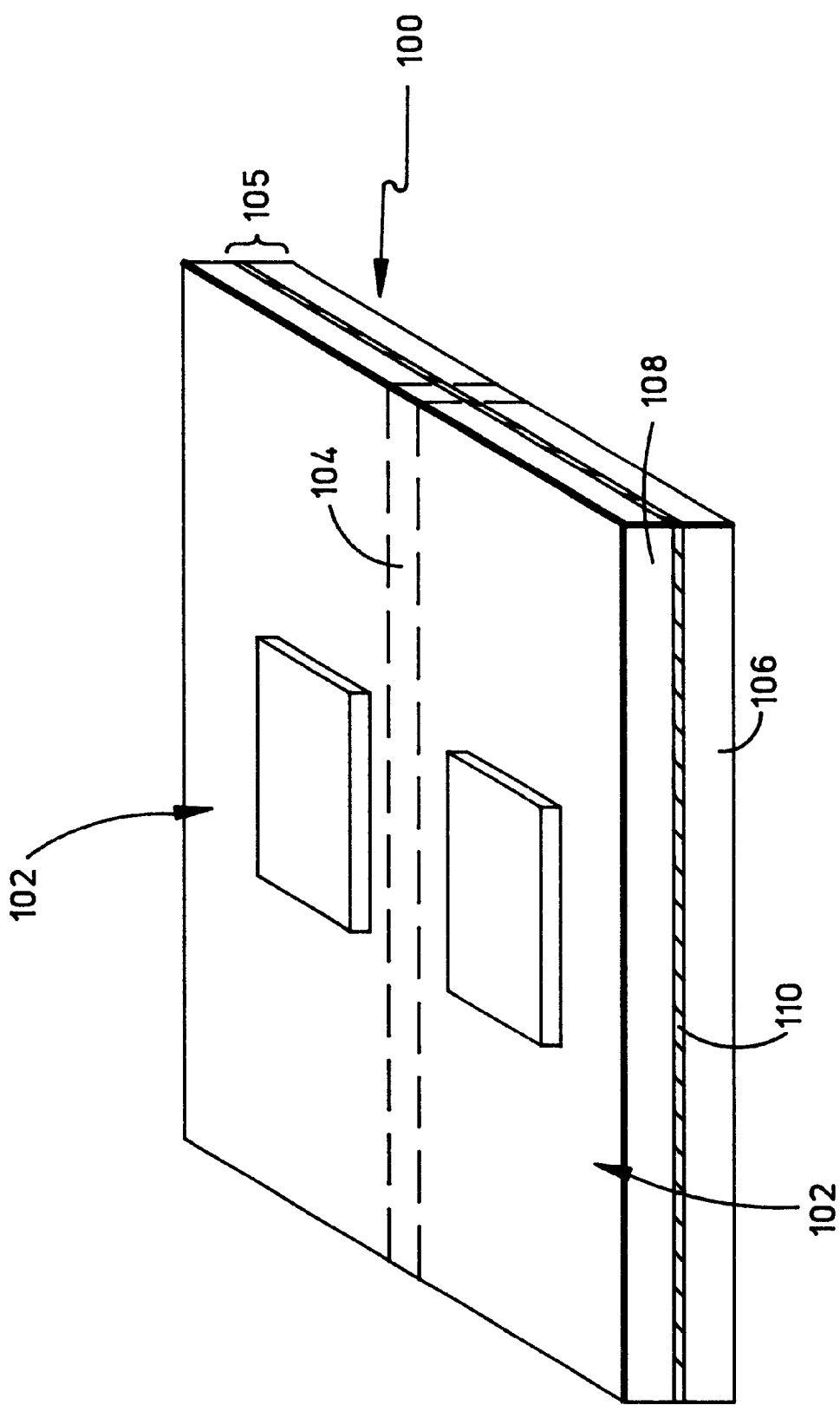
FIG. 1 is a block diagram illustrating a top view of a substrate structure with a plurality of components.

FIG. 1 is block diagram of an isometric view of a substrate structure 100 having a plurality of components 102. The substrate structure 100 includes one or more materials positioned over base 105 that includes a substrate 106 or a wafer. For example, the substrate structure 100 can include a light transmitting medium 108 positioned over a base 105 that includes a light barrier 110 positioned over a substrate 106. A silicon on insulator wafer is an example of a substrate structure 100. The typical silicon on insulator wafer includes a layer of silicon that serves as the light transmitting medium 108, a layer of silica that serves as the light barrier 110 and another layer of silicon that serves as the substrate 106. Other materials and combinations of materials may be used for the substrate structure 100. Examples of suitable materials include Silicon, silica, Silicon dioxide, Gallium Arsenide, InP, LiNbO$_3$, and Polymer materials. Those skilled in the art will other materials that can be used to form components 102 on the substrate 106.

Although the substrate structure 100 illustrated in FIG. 1 includes only two components 102 and has a rectangular shape, those skilled in the art will recognize that the substrate structure 100 can be other shapes such as circular and/or contain more than two components 102.

A separation region 104 of the substrate structure 100 is located between optical components 102. A separation etch is performed on the separation region so as to remove enough of the substrate structure 100 to allow the components 102 be separated. As is explained in further detail below, the separation region 104 of the substrate structure 100 can have a variety of shapes and contours. The separation region 104 of the substrate structure 100, for example, may be curved. Further, the etching process may require etching through one or more layers of materials, the use of different etchants and/or the use of multiple etching steps. A suitable etch for removing the separation region 104 of the substrate structure 100 is a reactive ion etch, an etch according to the Bosch process or an etch in accordance with U.S. patent application entitled "Formation Of A Vertical Smooth Surface On An Optical Component 102", Ser. No. 09/690,959, filed on Oct. 16, 2000 and incorporated herein in its entirety.

Figure 2A:
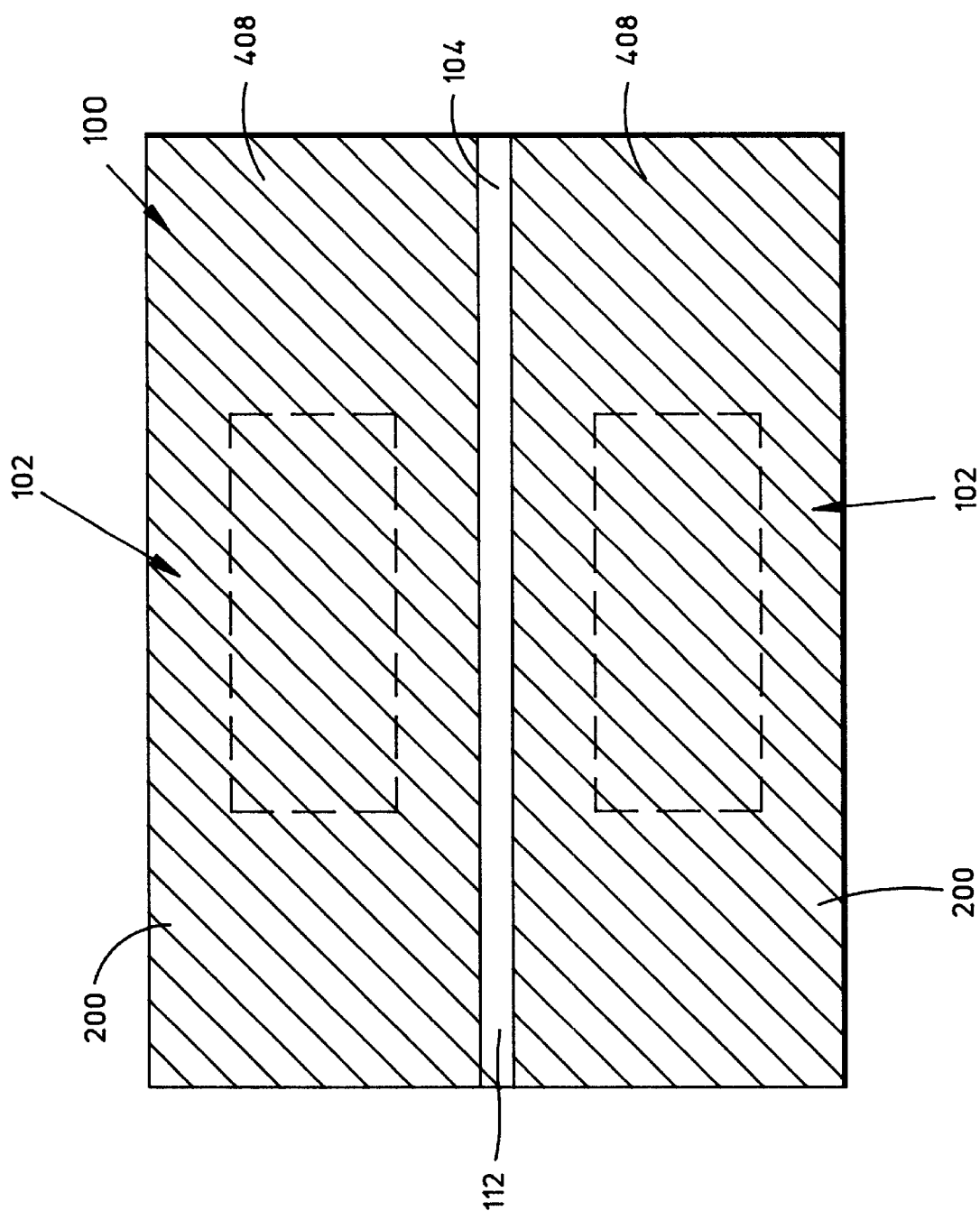
FIG. 2A is a block diagram of the substrate structure after a mask is formed to expose the separation region of the substrate structure.

FIG. 2A is a block diagram of a substrate structure 100 after a mask 200 is formed over the substrate structure 100. The mask is formed so the separation region 104 of the substrate structure 100 remains exposed. A suitable method of forming masks includes, but is not limited to, applying a mask material to the entire surface of the substrate structure 100 including the separation region 104. The mask material is selectively exposed to light of an appropriate wavelength. The light is patterned as the separation region 104. The substrate structure 100 is washed in a solution to remove the areas exposed to the light. The resulting mask 200 leaves the separation region 104 exposed.

Although the separation region 104 is illustrated as being positioned between adjacent components 102, the separation region 104 can also be positioned at an edge of the substrate structure 100. For instance, it may be desirable to separate a single component 102 from a portion of the substrate structure 100 or it may be desirable to trim a portion of the substrate structure 100 away from the component 102.

The separation etch is performed by applying a corrosive substance to the exposed regions of the substrate structure 100. The separation etch removes the separation region 104 of the substrate structure 100 and results in formation of a groove 112 in the substrate structure 100. A variety of corrosive substances (etchants) can be used and applied in different ways. A suitable separation etch includes a reactive ion etch, an etch according to the Bosch process or an etch in accordance with patent application Ser. No. 09/690,959 referenced above. In some instances, the substrate structure 100 is etched so the groove 112 extends through the light transmitting medium 108. In other instances, the groove 112 extends to a depth within the base 105 or within the substrate 106. Alternatively, the separation etch can be performed so the groove 112 extends completely through the substrate structure 100.

Figure 2B:
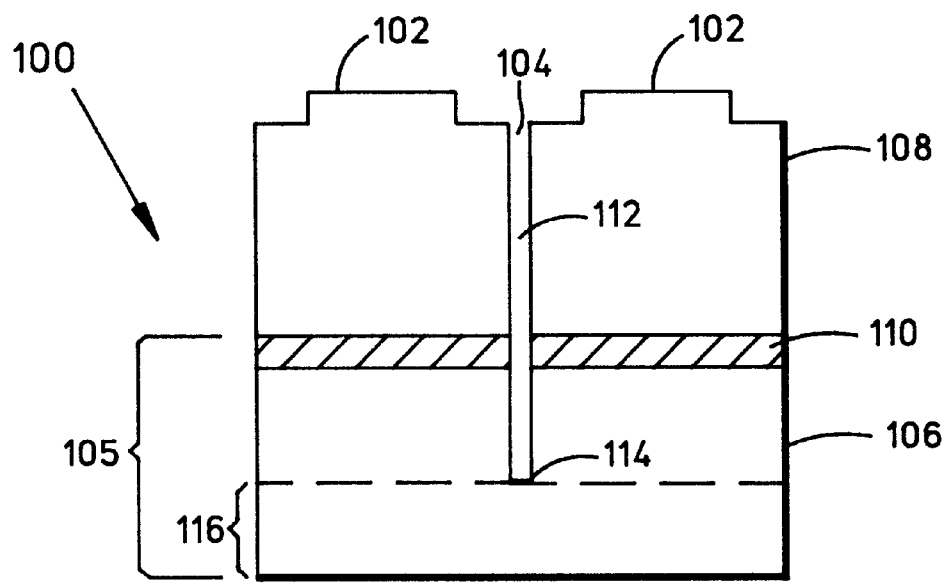
FIG. 2B is a block diagram of a side view of the substrate structure after separation etch has been performed so as to form a groove in the substrate structure.

FIG. 2B is a block diagram of a side view of the substrate structure 100 after the separation etch has been performed. The groove 112 is formed between the components 102 and extends into the substrate 106. A bottom portion 116 of the substrate structure 100 can be removed to a depth sufficient to allow separation of the components 102. Suitable methods for removing the bottom portion 116 of the substrate structure 100 include, but are not limited to, milling, polishing or etching to remove the bottom portion 116 of the substrate 106.

Although the groove 112 is illustrated as being formed between the components 102, the groove 112 can be formed at an edge of the substrate structure 100 as would result when all or a portion of the separation region 104 is located at the edge of the substrate structure 100. When a groove 112 is formed at an edge of the substrate structure 100, a vertical side of the groove 112 is missing.

Figure 2C:
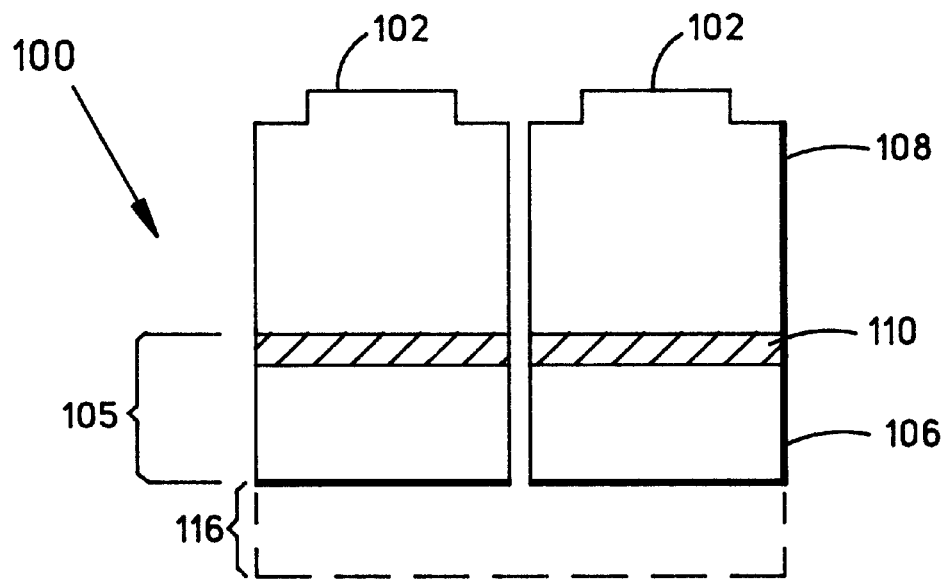
FIG. 2C is block diagram of a side view of the substrate structure after the bottom portion of the substrate is removed.

FIG. 2C is block diagram of a side view of the substrate structure 100 after the bottom portion 112 of the substrate 106 is removed. Removing the bottom of the substrate structure 100 removes enough of the substrate 106 to allow the components 102 to separate and does not necessarily include removing the entire substrate 106 from the bottom 114 of the groove 112 to the bottom of the substrate structure 100. For example, enough substrate 106 material can be removed to allow the components 102 to snap apart when a slight force is applied.

Removing the bottom of the substrate structure 100 can reduce the time for separating the components 102 since the relatively slow separation etch need not form the groove 112 through the entire depth of the substrate structure 100. Those skilled in the art will recognize that various modifications to the exemplary embodiments can be used to separate components 102 in accordance with the teachings herein. For example, one or more etching steps can be used to separate the components 102 without polishing the bottom of the substrate structure 100.

Figure 2D:
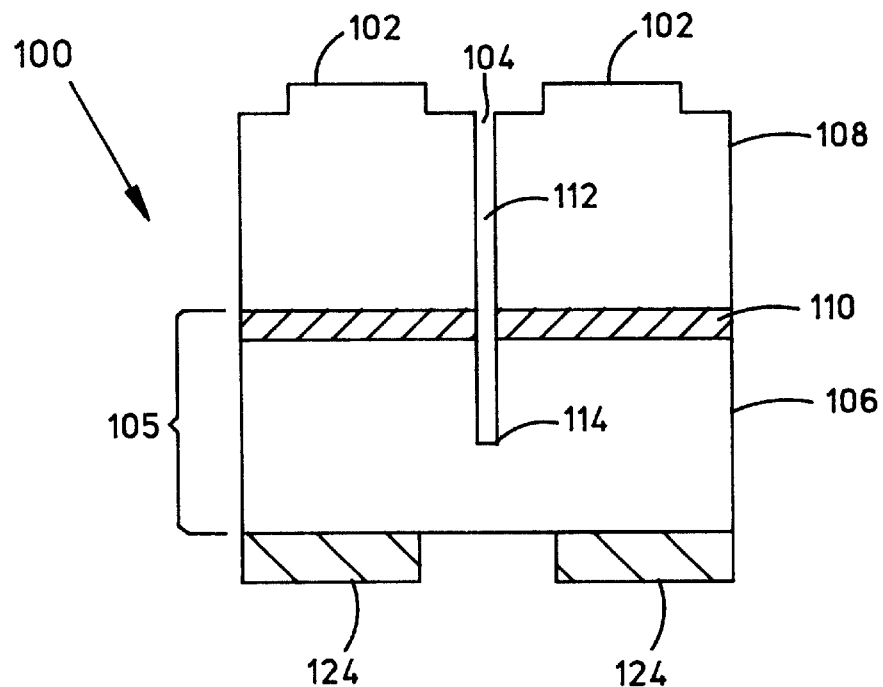
FIG. 2D is block diagram of a side view of the substrate structure after a mask is formed on a bottom of the substrate structure.
Figure 2E:
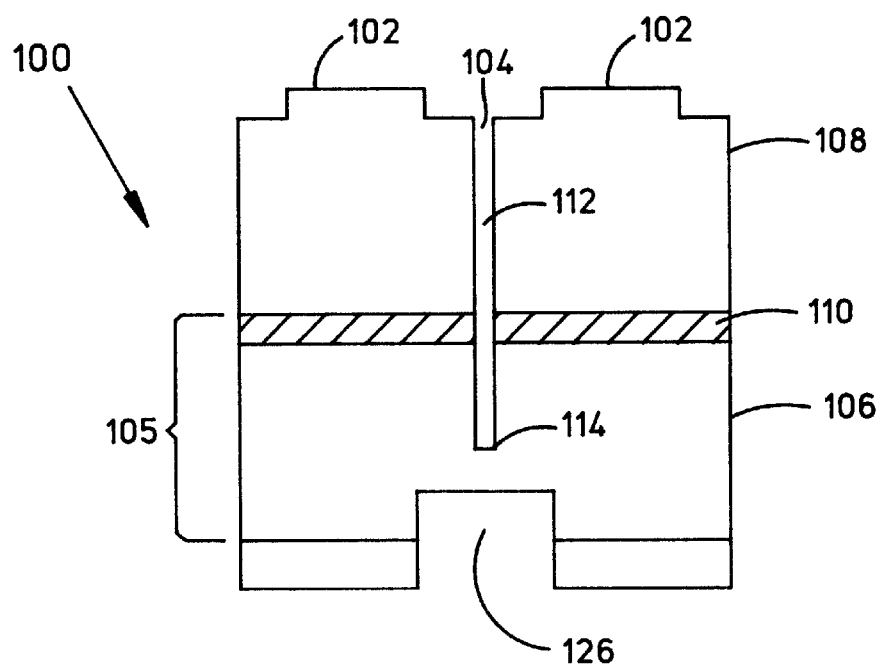
FIG. 2E is block diagram of a side view of the substrate structure after a second groove is formed on the bottom of the substrate structure.

In some instances, the bottom of the substrate structure 100 is selectively removed. For instances, a mask 124 can be formed on the bottom of the substrate so the portion of the substrate structure 100 opposite the groove 112 remains exposed as shown in FIG. 2D. An etch can then be performed so as to form a second groove 126 as shown in FIG. 2E. The second groove 126 can be formed to depth that allows the components 102 to be separated.

Because etching a second groove 126 leaves the bottom of the substrate structure 100 largely intact, the components 102 retain the strength of the original substrate structure 100. For instance, the strength of the substrate 106 can be retained. Additionally, the etch used to form the second groove 126 can employ a different etchant and/or different etchant application conditions than the separation etch. Because the second groove 126 is not through or into the light transmitting medium 108, the etch used to form the second groove 126 will not substantially affect component 102 performance. As a result, the etch used to form the second groove 126 can have a faster etch rate. Additionally, the etch used to form the second groove 126 can result in rougher surfaces than the separation etch.

In some instances, the bottom of the substrate structure 100 is not removed. For instance, the substrate structure 100 can be cut with a laser or other device. The cut is done through the groove 112 so only the base 105 is cut. Because the light transmitting medium 108 is not affected by the cut, the cut does not substantially affect performance of the optical components 102.

Figure 3A:
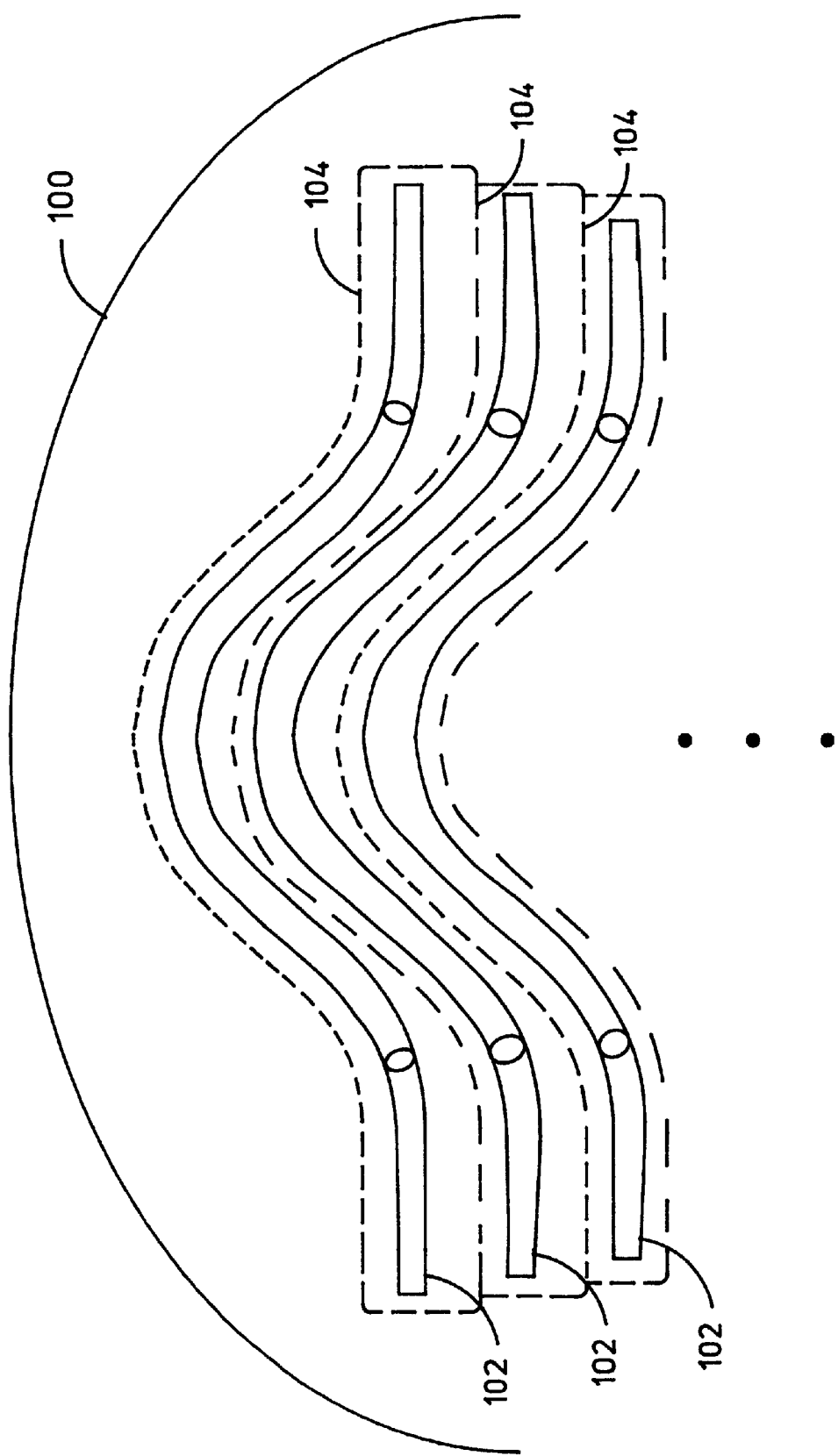
FIG. 3A illustrates the substrate structure with a plurality of components having a curved shape.

FIG. 3A is a topview of a substrate structure 100 having a plurality of optical components to be separated. Examples of optical components include, but are not limited to, attenuators, switches, demultiplexers and wavelength routers. Wavelength routers having a curved shape are illustrated. The curved shape of the wavelength routers allows them to be placed on the substrate structure 100 in a nested configuration. The nested configuration allows the number of wavelength routers on the substrate structure 100 to be maximized. The separation region 104 is shaped such that separating the substrate structure 100 along the separation region 104 results in separation of the waveguide routers 102.

In conventional methods, performance of the optical devices is negatively impacted if the components 102 are spaced too closely. Fissures and fractures caused by conventional separation means such as cutting or milling propagate over time into the optical components 102 requiring an increased space between the optical components 102. Because these fissures, fractures and other stresses do not occur as a result of the separation etch, the present invention allows the components 102 to be placed closer to one another on a substrate structure 100.

Figure 3B:
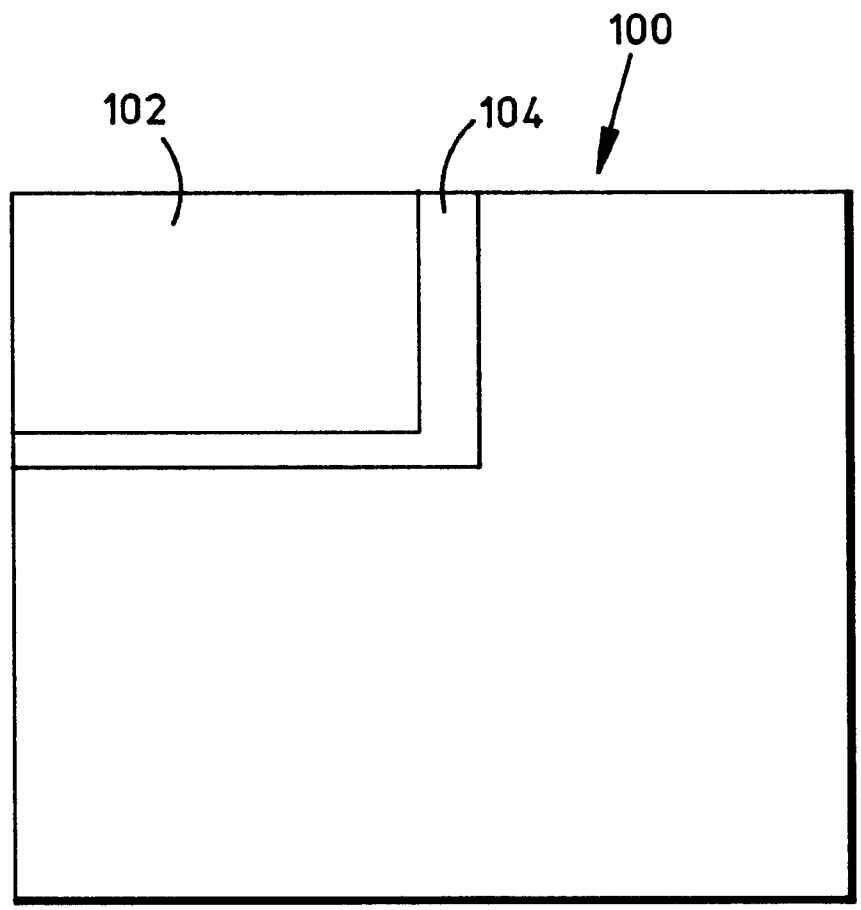
FIG. 3B illustrates the substrate structure with a single component.

The separation etch can also be used to separate a single optical component 102 from the substrate structure 100. For instance, FIG. 3B illustrates a single component 102 formed on a substrate structure 100. The separation region 104 is selected such that separating the substrate structure 100 at the separation region 104 separates the optical component 102 from the substrate structure 100. Although the separation region 104 is shown as being positioned adjacent to two sides of the component 102, the separation region 104 can be positioned adjacent to one side, three sides or four sides of the component 102 and/or can surround the component 102.

As illustrated in FIG. 3A, the separation region 104 can have a curved shape that defines the sides of the component 102 so they are difficult to distinguish or provides the component with more than four sides. Accordingly, the separation region can define at least 25% of the component perimeter, more than 50% of the component perimeter or more than 75% of the component perimeter. Additionally, the separation region 104 can cover an angular range measured from a central location on the component 102. The angular range can be greater than or equal to 90 degrees, 180 degrees, 270 degrees or 360 degrees. For instance, the separation region in the component of FIG. 3B extends over 180 degrees from a central point on the component.

The optical component 102 can include one or more waveguides. The waveguides can end in a facet through which light signals enter and/or exit the optical component 102. One or more of these facets can be formed in part or in whole during the separation etch. FIG. 4A through FIG. 4I illustrate a method of forming a facet during a separation etch. Although various optical components 102 can be formed in accordance with the invention, for illustrative purposes, the formation of waveguide 404 of an optical router is discussed. Those skilled in the art will readily apply the teachings herein to other optical interfaces in addition to waveguides 404 to form a facet 412 in accordance with the invention.

FIG. 4A is a topview of a substrate structure 100 and FIG. 4B is a side view of the substrate structure 100 taken at the dashed line on FIG. 4A. The dashed line denotes the location where the facet 412 is to be formed. The substrate structure 100 includes a light transmitting medium 108 positioned over a base 105 that includes a light barrier 110 and substrate 106. A first mask 400 is formed over the region of the substrate structure 100 where the ridge of a waveguide 404 is to be formed. The separation region 104 and secondary regions located adjacent to the ridge remain exposed. The first mask 400 can also cover other regions of the substrate structure 100 where a ridge is to be formed. For instance, the first mask 400 can also cover the ridge of a star coupler or Rowland circle.

A first etch is performed and the first mask 400 removed to provide the optical substrate structure 100 illustrated in FIG. 4C and FIG. 4D. FIG. 4C is a top view of the substrate structure 100 and FIG. 4D is a cross section of the substrate structure 100 taken at the dashed line in FIG. 4C. The first etch results in formation of sides of a ridge on the substrate structure 100. The first etch also forms an upper region 414 of the facet 412 at the end of the ridge. The first etch can be the same type of etch as the separation etch or can be a different type of etch. Because the sides of the ridge and the upper region 414 of the facet 412 preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959 referenced above. Because the separation region 104 remains exposed during the first etch, a portion of the separation regions 104 is removed during the first etch.

A second mask 408 is formed on the substrate structure 100 to provide the substrate structure 100 illustrated in FIG. 4E. FIG. 4E is topview of the substrate structure 100. The second mask 408 is aligned with the upper region 414 of the facet 412. The ridge and the secondary regions are protected while the separation region 104 remains exposed.

Figure 4F:
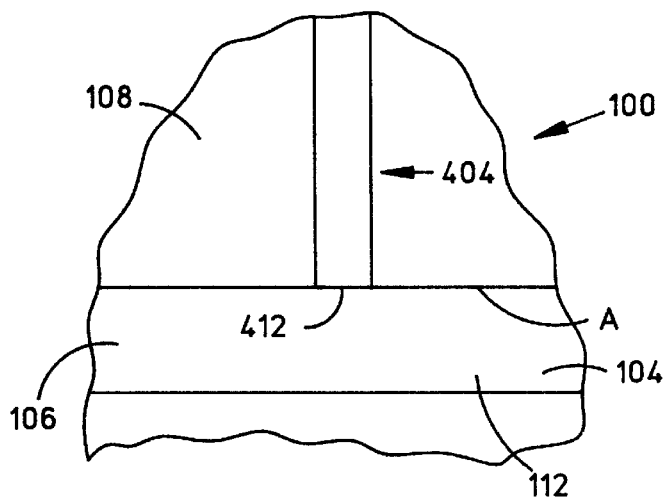
Figure 4G:
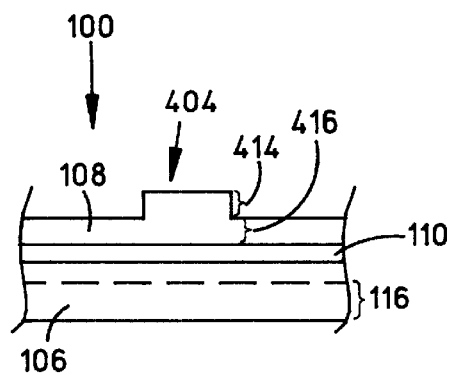

A second etch is performed and the second mask 408 removed so as to provide the substrate structure 100 shown in FIG. 4F and FIG. 4G. FIG. 4F is a topview of the substrate structure 100 and FIG. 4G is a cross section of the substrate structure 100 taken at the line labeled A in FIG. 4F. For the purposes of illustration, the depth of the separation etch is illustrated by the dashed line in FIG. 4G. The second etch forms a lower region 416 of the facet 412 at the end of the ridge. The second etch employs the same etchant and etchant application conditions as the separation etch and is performed to the depth of the separation etch. As a result, the second mask can be the mask 200 discussed with respect to FIG. 2A.

Figure 4H:
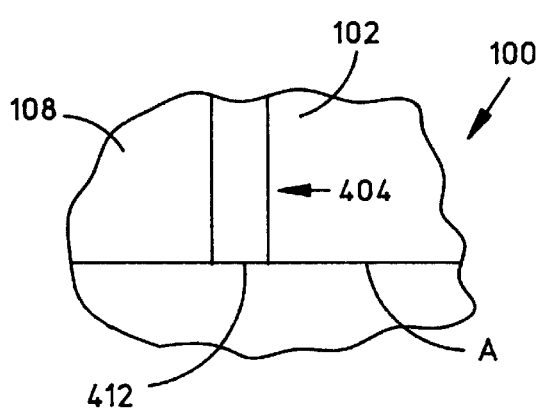
Figure 4I:
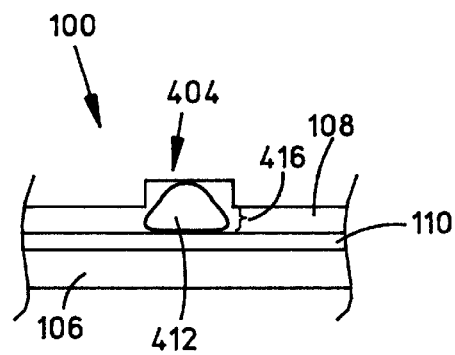

The base 105 can be removed from the bottom side of the substrate structure 100 to provide the substrate structure 100 shown in FIG. 4H and FIG. 4I. FIG. 4H is a topview of the substrate structure 100 and FIG. 4I is a cross section of the substrate structure 100 taken at the line labeled A in FIG. 4H. In some instances, the base 105 is removed to the depth of the separation etch. Alternatively, a smaller amount of the base 105 or none of the base 105 can be removed and the remaining portion of the base 105 can be cracked, cleaved or cut. As noted above, suitable methods for removing the base 105 include, but are not limited to polishing, milling or etching the bottom of the substrate structure 100. Further, the substrate 106 can be selectively removed by forming a second groove 126 into the base 105 opposite the groove 112 formed by the separation etch. Finally, the substrate structure 100 can be cut through the groove 112 formed by the separation etch.

The ridge defines a portion of a light signal carrying region of a waveguide 404. The light barrier 110 is constructed to reflect light signals from the light signal carrying region back into the light signal carrying region. As a result, the light barrier 110 also defines a portion of the light signal carrying region. The profile of a light signal is illustrated by the line labeled A in FIG. 4I.

Figure 5F:
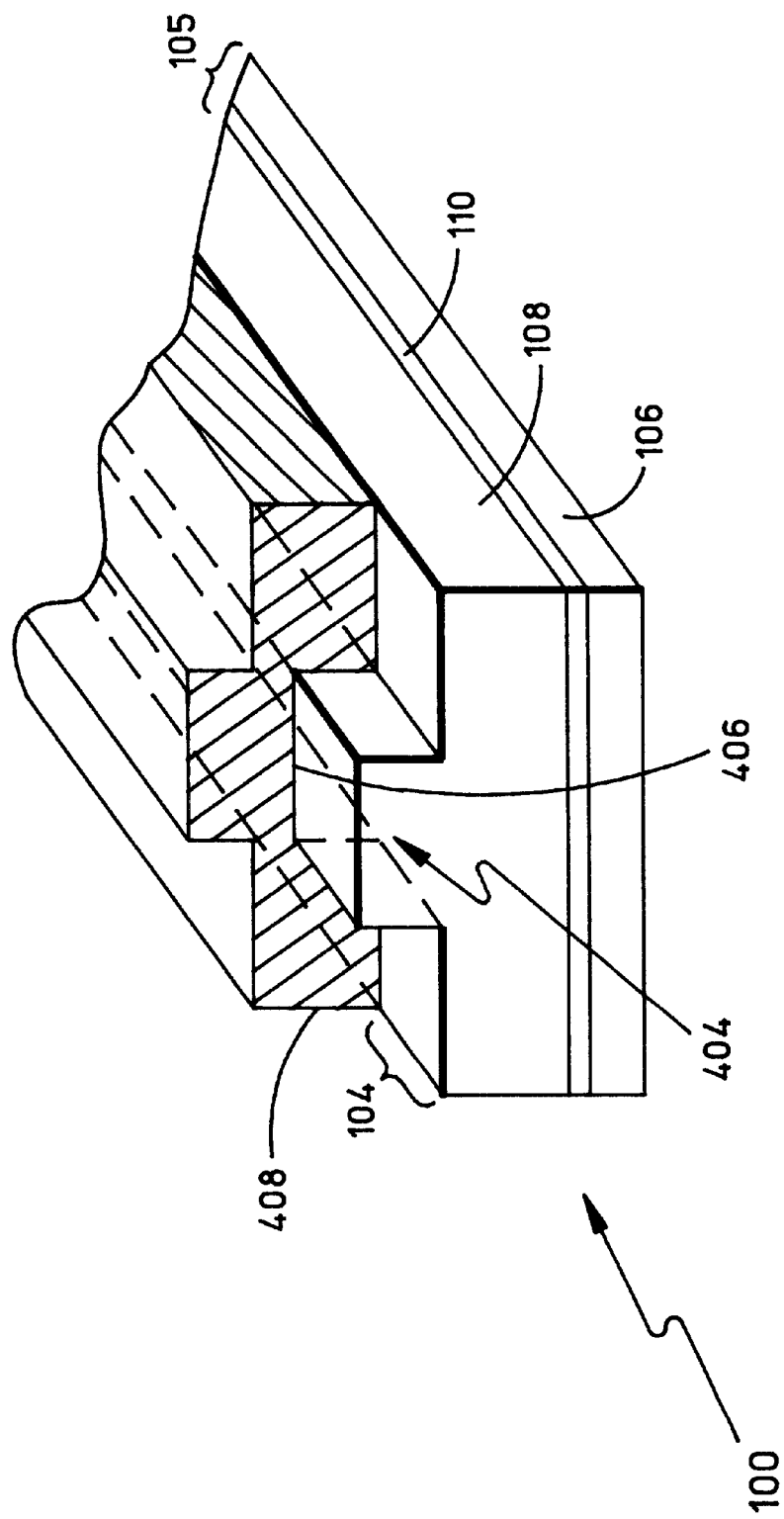

FIG. 5A through FIG. 5J illustrate another method of forming a facet 412 during a separation etch. The method illustrated in FIG. 5A through FIG. 5J does not require alignment of subsequently formed masks. FIG. 5A is a topview of a substrate structure 100 and FIG. 5B is a side view of the substrate structure 100 taken at the dashed line on FIG. 5A. The dashed line denotes the location where the facet 412 is to be formed. The substrate structure 100 includes a light transmitting medium 108 positioned over a base 105 that includes a light barrier 110 and substrate 106. A first mask 400 is formed over the region of the substrate structure 100 where the ridge of a waveguide 404 is to be formed. In contrast to FIG. 4A, the waveguide is formed past the location where the facet is to be formed. The separation region 104 and secondary regions located adjacent to the ridge remain exposed. The first mask 400 can also cover other regions of the component where a ridge is to be formed. For instance, the first mask 400 can also cover the ridge of a star coupler or Rowland circle.

A first etch is performed and the first mask 400 removed to provide the substrate structure 100 illustrated in FIG. 5C and FIG. 5D. FIG. 5C is a top view of the substrate structure 100 and FIG. 5D is a cross section of the substrate structure 100 taken at the dashed line in FIG. 5C. The first etch results in formation of sides of a ridge on the substrate structure 100. The first etch can be the same type of etch as the separation etch or can be a different type of etch. Because the sides of the ridge and the upper region 414 of the facet 412 preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959, referenced above. Because the separation region 104 can remain exposed during the first etch, a portion of the separation regions 104 can be removed during the first etch.

Figure 5G:
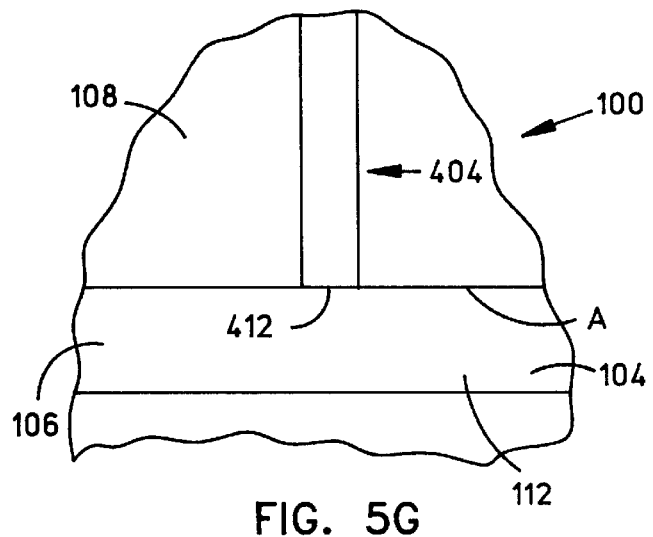
Figure 5H:
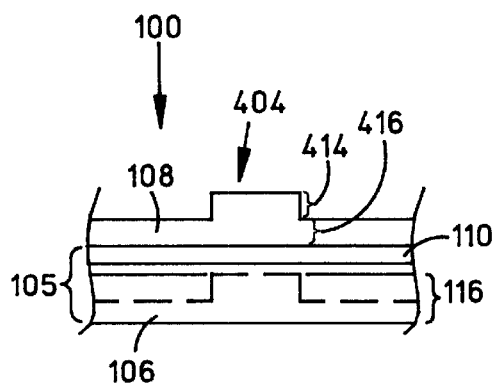

A second etch is performed and the second mask 408 removed so as to provide the substrate structure 100 shown in FIG. 5G and FIG. 5H. FIG. 5G is a topview of the substrate structure 100 and FIG. 5H is a cross section of the substrate structure 100 taken at the line labeled A in FIG. 5G. For the purposes of illustration, the depth of the separation etch is illustrated by the dashed line in FIG. 5H. The second etch step and the separation etch are the same step. As a result, the second mask 408 can be the mask 200 discussed with respect to FIG. 2A. The second etch forms the entire facet 412. Accordingly, there is no need to achieve precise alignment of subsequently formed masks.

A second etch is performed and the second mask 408 removed so as to provide the substrate structure 100 shown in FIG. 5G and FIG. 5H. FIG. 5G is a topview of the substrate structure 100 and FIG. 5H is a cross section of the substrate structure 100 taken at the line labeled A in FIG. 5G. For the purposes of illustration, the depth of the separation etch is illustrated by the dashed line in FIG. 5H. The second etch is the same as the separation etch and is performed to the depth of the separation etch. As a result, the second mask can be the mask 200 discussed with respect to FIG. 2A. The second etch forms the entire facet 412. Accordingly, there is no need to achieve precise alignment of subsequently formed masks.

Figure 5I:
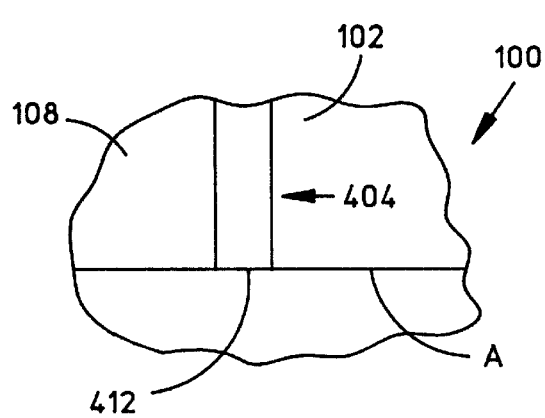
Figure 5J:
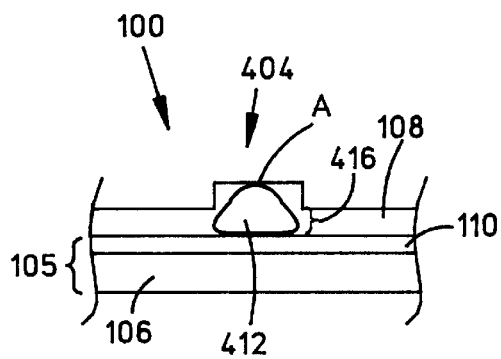

The base can be removed from the bottom of the substrate structure 100 to provide the substrate structure 100 shown in FIG. 5I and FIG. 5J. FIG. 5I is a topview of the substrate structure 100 and FIG. 5J is a cross section of the substrate structure 100 taken at the line labeled A in FIG. 5I. In some instances the base 105 is removed to the depth of the separation etch. Alternatively, a smaller amount of the base 105 or none of the base 105 can be removed and the remaining portion of the base 105 can be cracked, cleaved or cut. As noted above, suitable methods for removing the base 105 include, but are not limited to polishing, milling or etching the bottom of the substrate structure 100. Further, the substrate 106 can be selectively removed by forming a second groove 126 into the base 105 opposite the groove 112 formed by the separation etch. Finally, the substrate structure 100 can be cut through the groove 112 formed by the separation etch.

The ridge defines a portion of a light signal carrying region of a waveguide 404. The light barrier 110 is constructed to reflect light signals from the light signal carrying region back into the light signal carrying region. As a result, the light barrier 110 also defines a portion of the light signal carrying region. The profile of a light signal is illustrated by the line labeled A in FIG. 5J.

Figure 6A:
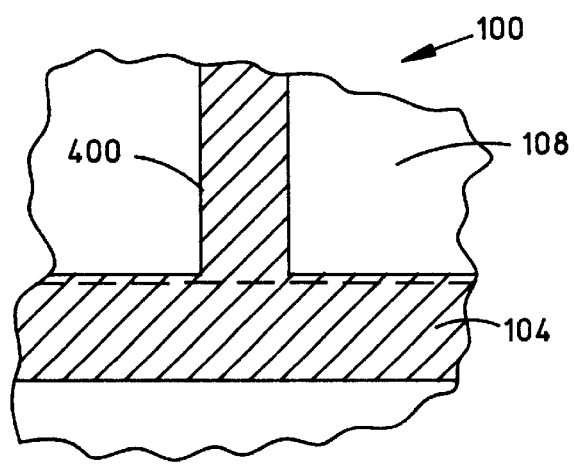
FIG. 6A through FIG. 6J illustrate another embodiment of a method for forming a facet during a separation etch. The illustrated method does not require alignment of subsequently formed masks.
Figure 6B:
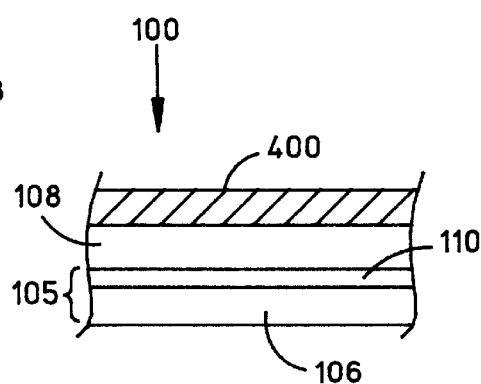

FIG. 6A through FIG. 6J illustrate another embodiment of forming a facet of a waveguide during the separation etch. The illustrated method does not require alignment of subsequently formed masks. FIG. 6A is a top view of a substrate structure 100 and FIG. 6B is a sideview of the substrate structure 100 taken at the dashed line shown in FIG. 6A. A first mask 400 is formed so the regions of the substrate structure 100 where the ridge of a waveguide 404 is protected. The first mask 400 also extends over the section of the substrate structure 100.

Figure 6C:
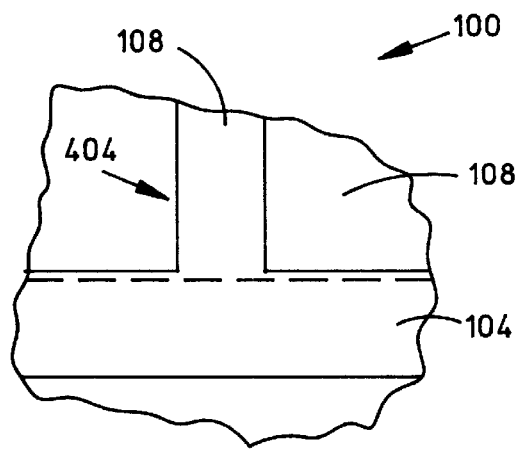
Figure 6D:
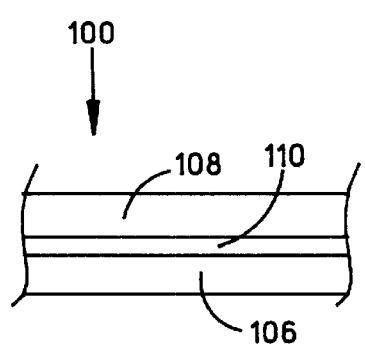

A first etch is performed and the first mask 400 removed to provide the substrate structure 100 illustrated in FIG. 6C and FIG. 6D. FIG. 6C is a top view of the substrate structure 100 and FIG. 6D is a cross section of the substrate structure 100 taken at the dashed line in FIG. 6C. The first etch results in formation of sides of a ridge on the substrate structure 100. The first etch can be the same type of etch as the separation etch or can be a different etch. Because the sides of the ridge preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959 referenced above.

A second mask 408 is formed on the substrate structure 100 to provide the substrate structure 100 illustrated in FIG.

Figure 6E:
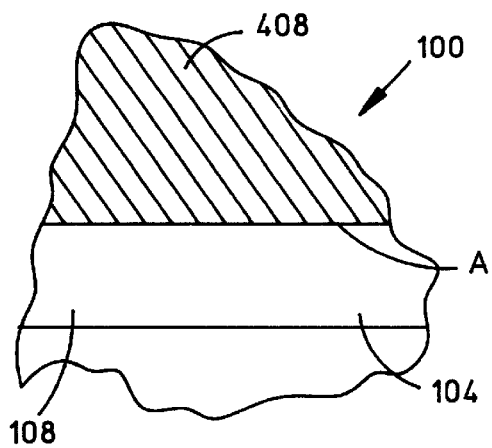
Figure 6F:
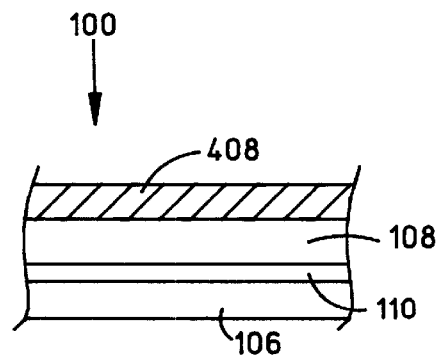

6E and FIG. 6F. FIG. 6E is topview of the substrate structure 100 and FIG. 6F is a cross section of the substrate structure 100 taken at the line labeled A. The second mask 408 is formed such that the waveguide 404 is protected. The second mask 408 overlaps a portion of the section of the substrate structure 100.

Figure 6G:
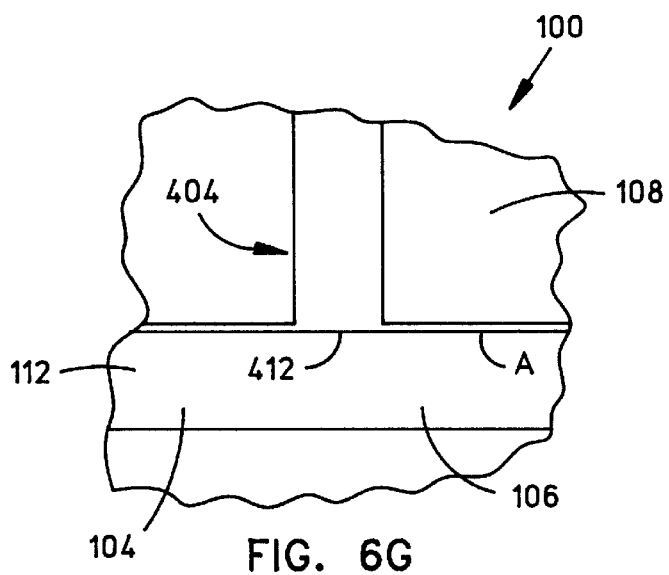
Figure 6H:
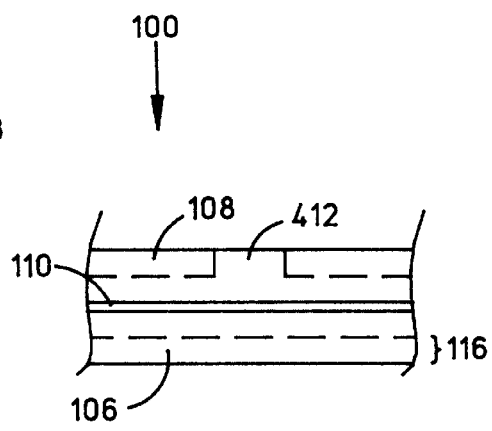

A second etch is performed and the second mask 408 removed so as to provide the substrate structure 100 shown in FIG. 6G and FIG. 6H. FIG. 6G is a topview of the substrate structure 100 and FIG. 6H is a cross section of the substrate structure 100 taken at the line labeled A in FIG. 6G. For the purposes of illustration, the depth of the separation etch is illustrated by the dashed line in FIG. 6H. The second etch forms the entire facet 412. As a result, there is no need to align subsequently formed masks. The second etch step and the separation etch are the same step. As a result, the second mask can be the mask 200 discussed with respect to FIG. 2A.

A flange extends outward from the waveguide 404 as illustrated by FIG. 6G and FIG. 6H. The flange is a result of the second mask 408 overlapping the section of the substrate structure 100. Reducing the degree of overlap can reduce the thickness of the flange. Additionally, achieving alignment between the second mask 408 and the section of the substrate structure 100 can eliminate the flange.

Figure 6I:
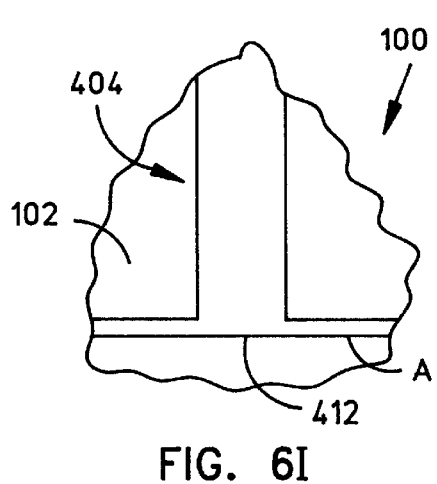
Figure 6J:
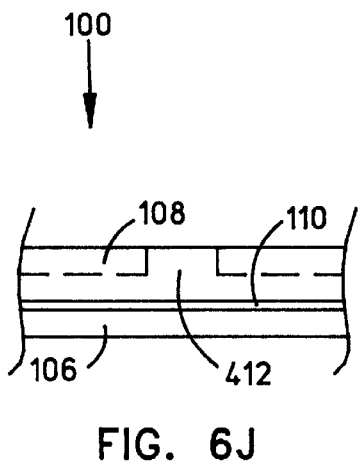

The substrate 106 can be removed from the substrate 106 side of the substrate structure 100 to provide the substrate structure 100 shown in FIG. 6I and FIG. 6J. FIG. 6I is a topview of the substrate structure 100 and FIG. 6J is a cross section of the substrate structure 100 taken at the line labeled A in FIG. 6I. The substrate 106 can be removed to the depth of the separation etch. Alternatively, a smaller amount of the substrate 106 or none of the substrate 106 can be removed and the remaining portion of the substrate 106 can be cracked, cleaved or cut. As noted above, suitable methods for removing the substrate 106 include, but are not limited to polishing, milling or etching the entire substrate 106 side of the substrate structure 100. Further, the substrate 106 can be selectively removed by forming a second groove 126 into the substrate 106 opposite the groove 112 formed by the separation etch. Finally, the substrate structure 100 can be cut through the groove 112 formed by the separation etch.

The facet 412 can be angled at less than ninety degrees relative to the direction of propagation of signals traveling along the waveguide 404. FIG. 7 is a topview of a waveguide 404 with a facet 412 that is vertical relative to the base 105 but has an angle α less than ninety degrees relative to the light signal direction of propagation. Forming the facet 412 at less than ninety degrees relative to the direction of propagation can cause light signals reflected at the facet 412 to be reflected out of the waveguide 404 as illustrated by the line labeled A.

Figure 7A:
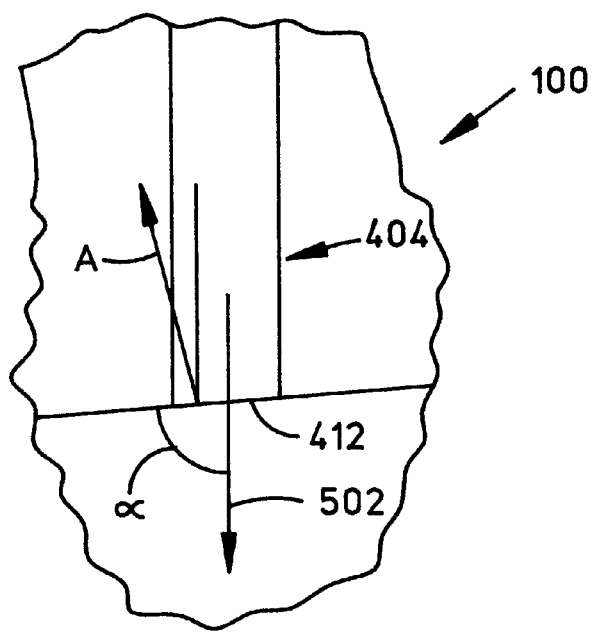
FIG. 7A is a block diagram illustrating a top view of a substrate structure having waveguide with a facet. The facet is formed at an angle less than ninety degrees relative to the direction of propagation of light signals traveling along the waveguide.

The components can include facets that are substantially perpendicular to the base but are angled at less than ninety degrees relative to a direction of propagation of light signals along the waveguide. For instance, FIG. 7A is a topview of a waveguide having a facet with an angle α that is less than ninety degrees relative to the direction of propagation of light signals along the waveguide. The angled facet 412 can cause a light signal that is reflected off the facet 412 from within the waveguide 404 to be reflected out of the waveguide as illustrated by the arrow labeled A. Reflecting these light signals out of the waveguide 404 can prevent them from resonating in the waveguide 404.

The return losses can increase as the facet angle α is decreased. Accordingly, there can be a tradeoff of a desired increase in return loss and the undesired increase in insertion loss. Although the facet angle α may range anywhere from a few degrees to tens of degrees, the most desirable performance will be achieved with an angle of 70 to 90 degrees, 80 to 98 degrees 90 to 95 degrees or 92 to 94 degrees. The facet angle α is substantially equal to 93 degrees in some instances. Those skilled in the art will readily apply the teachings herein to choose a facet angle α to obtain the desired results without undue experimentation.

Figure 7B:
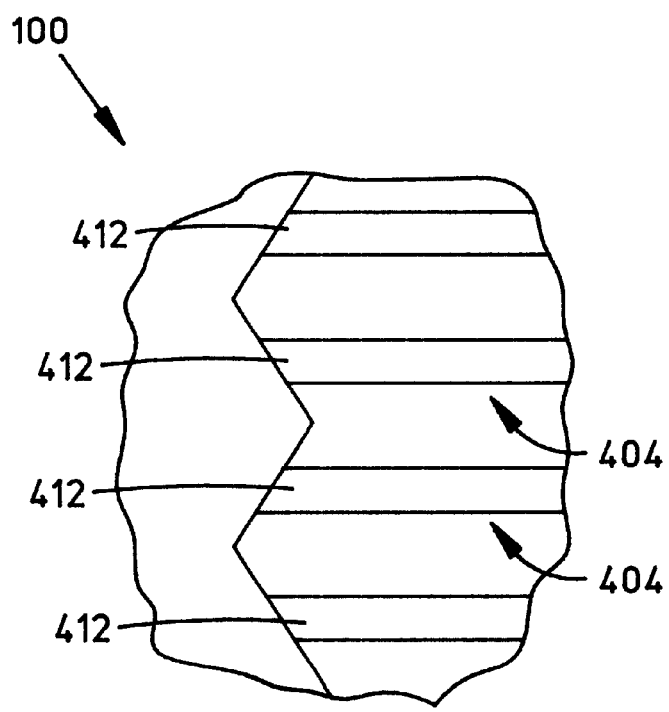
FIG. 7B illustrate a component having a plurality of waveguides that each end in a facet angled at less than ninety degrees relative to the direction of propagation of light signals traveling along the waveguide.

FIG. 7B is a topview of an optical component 102 having a plurality of waveguide 404. Each waveguide 404 ends in a facet 412. The direction of the facet angle on adjacent waveguides 404 is alternated so as to provide a zig zag configuration of facets 412 at the edge of the component 102. The component 102 can also be constructed so the facet 412 direction is alternated less frequently than every facet 412.

The methods discussed with respect to FIG. 4A through FIG. 6J can be adapted to formation of optical components having angled facets. For instance, the mask(s) can be formed with an edge positioned at less than ninety degrees relative to the direction of propagation of light signal along the waveguide.

Figure 8:
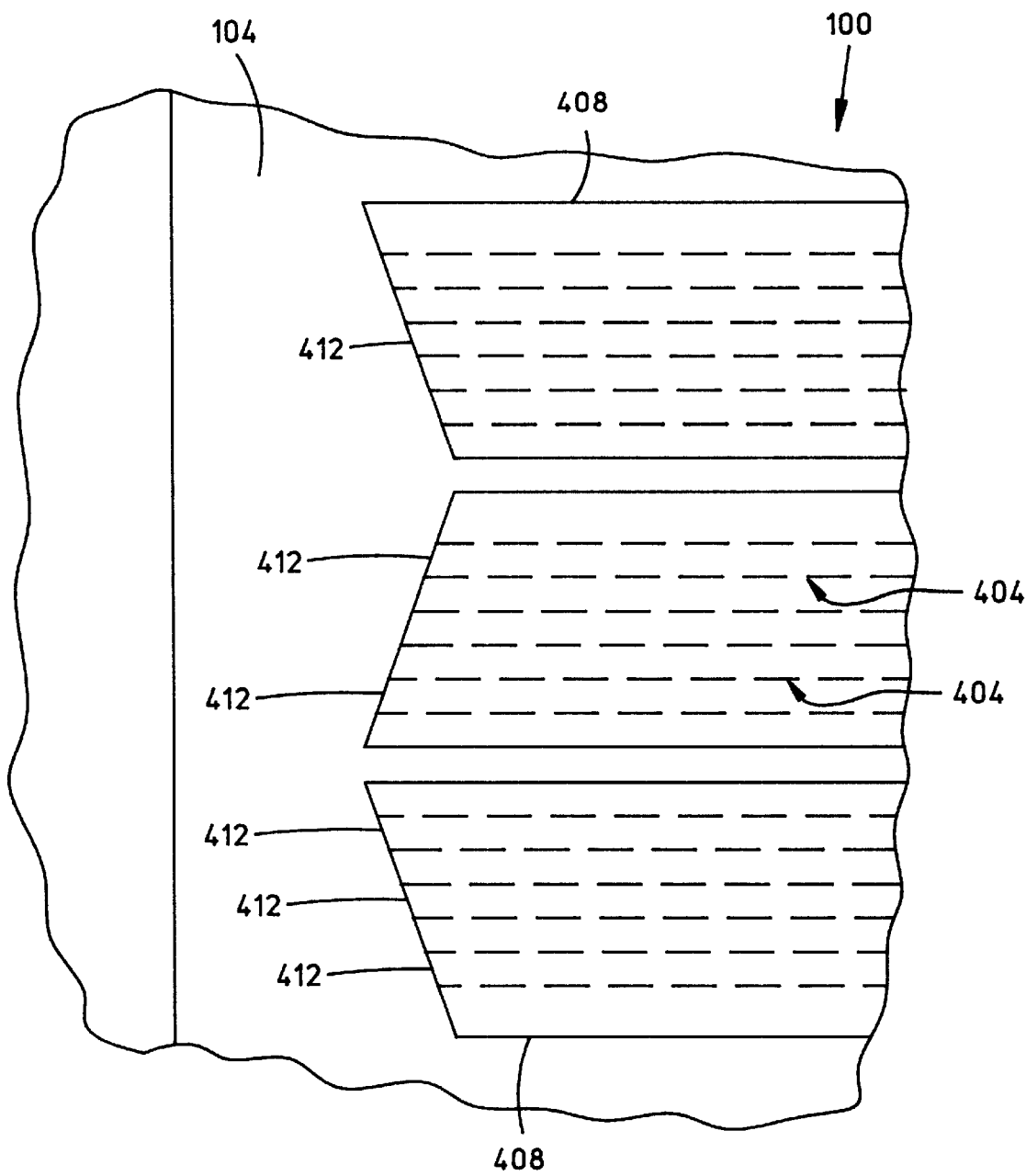
FIG. 8 is a block diagram illustrating a top view of the substrate structure with a mask positioned at the intended location of facets for a plurality of optical components.

FIG. 8 illustrate FIG. 5E and FIG. 5F adapted to formation of waveguides 404 with facets angled at less than ninety degrees relative to the direction of propagation of light signals traveling along the waveguides 404. FIG. 8 is a top view of a substrate structure 100 including a plurality of optical components 102. Each optical component includes more than one waveguide 404. The second mask of FIG. 5E and FIG. 5F is positioned such that the separation region 104 remains exposed. The location of the waveguides 404 under the mask is illustrated as dashed lines.

The mask of FIG. 8 includes an edge positioned at the intended location of the facets 412. The mask is angled at less than ninety degrees relative to the direction of propagation of light signals along the waveguides. The angled facets will be formed as a result of performing the second etch with the mask in place.

The facets 412 that result from the second etch on each component 102 of FIG. 8 will be angled in the same direction although the direction of the facets 412 on adjacent components 102 is alternated. Alternatively, the direction of the facets 412 on an optical component 102 can be alternated as discussed with respect to FIG. 7B. Further, components having angled facets can be combined with components having facets that are substantially perpendicular to the direction of propagation. Additionally, a single component can have angled facets and facets that are substantially perpendicular to the direction of propagation.

Figure 9:
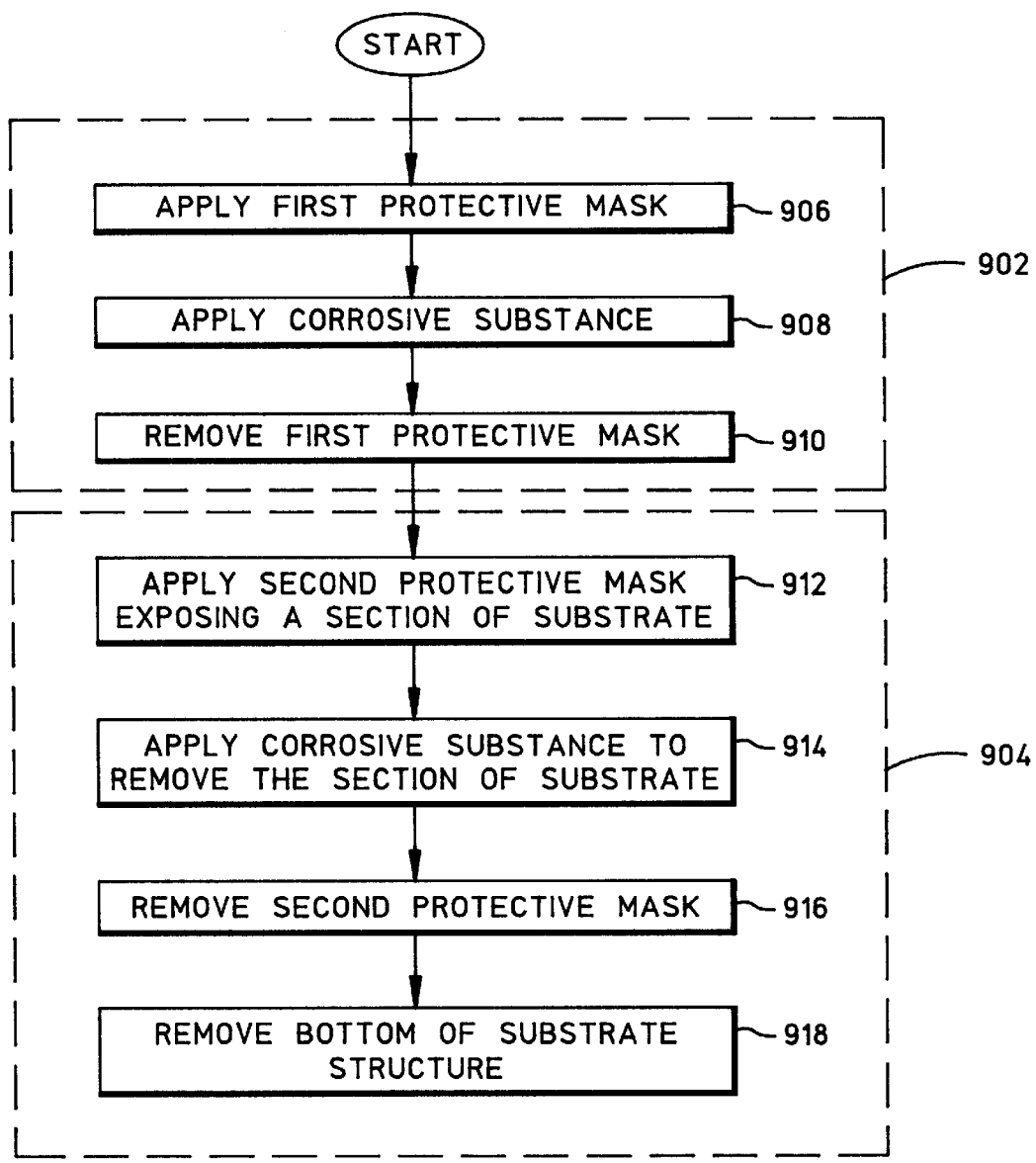
FIG. 9 is flow chart of method of forming a component in a substrate structure.

FIG. 9 is flow chart of method of separating components 102 formed on a substrate 106. At step 902, a plurality of components 102 is at least partially formed by etching. At step 904, the plurality of components 102 are separated by etching. A first etch is performed to produce the optical components 102 and a second etch is performed to separate the components 102. Although any one of several etching techniques may be used for the etch and the second etch, suitable techniques include reactive ion etches, etches according to the Bosch process and etches in accordance with patent application Ser. No. 09/690,959. As discussed in further detail below, a facet 412 can be formed during the separation etch.

In the exemplary embodiment, step 902 comprises steps 906–910. At step 906, a first mask 400 is applied to the substrate structure 100 to protect the areas not to be etched. The first mask first mask 400 is applied in accordance with known techniques.

At step 908, a corrosive substance is applied to the substrate structure 100 in a first etch. The plurality of components 102 are at least partially formed as the etching process removes the selected portions of substrate 106 material. For instance, waveguides 404 can be at least partially formed during the first etch. Additionally, a region of a facet 412 can be formed during the first etch. Further, a portion of the separation region 104 can also be removed during the first etch.

At step 910, the first mask first mask 400 is removed. Any one of suitable known techniques may be used to remove the mask such as washing the substrate structure 100 in a solution to dissolve the first mask first mask 400.

Step 904 comprises steps 912 through 916 in the exemplary embodiment although a variety of techniques may be used to perform the second etch of step 904. At step 912, a second mask 408 is applied to the substrate structure 100 exposing a separation region 104 of the substrate structure 100 between the plurality of components 102. The separation region 104 of the substrate structure 100 may have a variety of shapes and may have straight of curved lines. Further, the separation region 104 of the substrate structure 100 may completely surround a component 102.

At step 914, a corrosive substance is applied in a second etch. The second etch removes at least a portion of the separation region 104 of the substrate structure 100. The separation region 104 of the substrate structure 100 is removed sufficiently to allow the plurality of components 102 to be separated when the bottom of the substrate structure 100 polished.

At step 916, the second mask 408 is removed. Known techniques can be used to dissolve the second mask 408.

The bottom of the substrate structure 100 can be removed in step 918. For instance, the substrate 106 can removed from the bottom of the substrate structure 100 by polishing, milling, grinding, etching or any other method suitable for efficiently removing the substrate 106. The substrate 106 is polished or milled to a point sufficiently near the bottom 114 of the groove 112 to separate the components 102. In view of the methods described above, optical components 102 can be separated concurrently with the formation of facets 412 on one or more waveguides 404.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of forming an optical component on a substrate structure, comprising:

forming a ridge of a ridge waveguide on an optical component located within the substrate structure, the ridge branching into a flange region extending along a perimeter of the optical component inside the perimeter of the optical component; and removing a portion of the substrate structure so as to expose a facet positioned at an end of the ridge the waveguide, the removed portion of the substrate structure being located outside the perimeter of the optical component and adjacent to the flange region before being removed.

2. The method of claim 1, further comprising:

forming a mask on the optical component so as to protect the flange region, the mask being formed before removing the portion of the substrate structure.

3. The method of claim 2, wherein the mask is formed such that the portion of the substrate structure to be removed from outside the perimeter of the optical component and adjacent to the flange region remains exposed.

4. The method of claim 2, wherein removing the portion of the substrate structure includes etching the substrate structure after forming the mask.

5. The method of claim 4, wherein the entire facet is exposed during the etch.

6. The method of claim 1, wherein an upper surface of the substrate structure is flat over an interface of the flange region and the portion of the substrate structure located outside of the perimeter of the optical component and adjacent to the flange.

7. The method of claim 1, further comprising:

forming a mask on the substrate structure so as to protect a region of the substrate structure outside the perimeter of the optical component and the region where the ridge is to be formed while leaving exposed regions of the optical component adjacent to the region where the ridge is to be formed, the mask being formed before forming the ridge.

8. The method of claim 7, wherein forming the ridge includes etching the substrate structure.

9. The method of claim 1, further comprising:

separating from the optical component substrate structure remaining attached to the optical component outside of the perimeter of the optical component after removing the portion of the substrate structure so as to expose the facet.

10. The method of claim 9, wherein separating the substrate structure adjacent to the optical component includes removing a portion of the bottom of the substrate structure.

11. The method of claim 4, wherein etching the substrate includes etching a separation region of the substrate structure, the separation region selected such that separating regions of the substrate structure along the separation region separates the optical component from the substrate structure.

12. The method of claim 11, wherein the etch is performed so as to form the facet at an angle less than ninety degrees relative to a direction of propagation of light signals along the waveguide.

13. The method of claim 12, wherein the facet is formed at an angle of about 92 to 94 degrees relative to the direction of propagation.

14. The method of claim 11, wherein etching the separation region is performed part way through the substrate structure; and further comprising:

removing the separation region remaining on the substrate structure after etching the separation region, the remaining substrate structure removed so as to separate the optical component from the substrate structure.

15. The method of claim 14, wherein removing the separation region remaining on the substrate structure includes starts at the bottom of the substrate structure and moves upward.

16. The method of claim 14, wherein removing the portion of the bottom of the substrate structure includes removing the substrate structure evenly across the entire bottom of the substrate structure.

17. The method of claim 16, wherein removing the portion of the bottom of the substrate structure includes a method selected from the group consisting of milling, polishing and etching.

18. The method of claim 4, wherein etching the substrate includes etching through a light transmitting medium positioned on a base, the light transmitting medium defining the ridge on the optical component.

19. The method of claim 4, wherein etching the substrate includes etching the entire thickness of the substrate structure.

* * * * *